US010236732B2

(12) United States Patent
Sugita et al.

(10) Patent No.: US 10,236,732 B2
(45) Date of Patent: Mar. 19, 2019

(54) INDUCTOR TYPE ROTARY MOTOR

(71) Applicant: SANYO DENKI CO., LTD., Tokyo (JP)

(72) Inventors: Satoshi Sugita, Tokyo (JP); Yuqi Tang, Tokyo (JP); Yasushi Misawa, Tokyo (JP); Shigenori Miyairi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 275 days.

(21) Appl. No.: 14/197,278

(22) Filed: Mar. 5, 2014

(65) Prior Publication Data
US 2014/0252901 A1 Sep. 11, 2014

(30) Foreign Application Priority Data

Mar. 5, 2013 (JP) .................. 2013-043251

(51) Int. Cl.
| H02K 1/17 | (2006.01) |
| H02K 21/44 | (2006.01) |
| H02K 1/12 | (2006.01) |
| H02K 1/14 | (2006.01) |
| H02K 16/02 | (2006.01) |

(52) U.S. Cl.
CPC .............. H02K 1/17 (2013.01); H02K 1/12 (2013.01); H02K 1/148 (2013.01); H02K 21/44 (2013.01); *H02K 16/02* (2013.01)

(58) Field of Classification Search
CPC .......... H02K 1/27; H02K 19/06; H02K 11/00; H02K 16/02
USPC ............ 310/154.11, 154.13, 154.28, 154.29, 310/154.42, 154.43, 155, 216.099, 216.1, 310/216.102
See application file for complete search history.

(56) References Cited

U.S. PATENT DOCUMENTS

| 2,323,114 A * | 6/1943 | Werner | H02K 1/148 310/216.057 |
| 3,671,787 A * | 6/1972 | Herron | H02K 23/04 310/154.11 |
| 5,218,250 A * | 6/1993 | Nakagawa | H02K 21/22 310/12.21 |

(Continued)

FOREIGN PATENT DOCUMENTS

| CN | 101106308 A | 1/2008 |
| CN | 103078466 A * | 5/2013 |

(Continued)

OTHER PUBLICATIONS

Machine Translation JP2004236369 (2004).*

(Continued)

*Primary Examiner* — Burton S Mullins
(74) *Attorney, Agent, or Firm* — Polsinelli PC

(57) ABSTRACT

The inductor type rotary motor of m-phase (m represents an integer of 2 or more) includes a stator in which distal ends of teeth are circularly disposed, and a rotor having an inductor tooth that faces each of the distal ends of the teeth through a constant gap. The stator includes k·m teeth (k represents an integer of 1 or more), at least one permanent magnet is disposed at each of the teeth, and adjacent permanent magnets, which belong to teeth adjacent to each other, are disposed in such a manner that different polarities face each other.

12 Claims, 21 Drawing Sheets

(56) References Cited

U.S. PATENT DOCUMENTS

| | | | |
|---|---|---|---|
| 6,242,834 B1* | 6/2001 | Akemakou | H02K 21/44 310/162 |
| 6,777,842 B2* | 8/2004 | Horst | H02K 21/04 310/154.11 |
| 7,928,612 B2* | 4/2011 | Chung | H02K 1/148 310/12.24 |
| 7,977,841 B2* | 7/2011 | Yang | H02K 1/02 310/181 |
| 8,508,095 B2* | 8/2013 | Husband | H02K 21/44 310/12.24 |
| 8,633,628 B2* | 1/2014 | Jung | H02K 21/44 310/181 |
| 2007/0029890 A1* | 2/2007 | Deodhar | H02K 21/44 310/216.074 |
| 2009/0127971 A1* | 5/2009 | Ishizeki | H02K 3/522 310/216.074 |
| 2009/0160391 A1* | 6/2009 | Flynn | H02K 21/44 318/701 |
| 2009/0289522 A1* | 11/2009 | Buban | H02K 1/148 310/216.113 |
| 2010/0123426 A1* | 5/2010 | Nashiki | H02K 1/12 318/701 |
| 2010/0259112 A1* | 10/2010 | Chung | H02K 16/00 310/12.18 |
| 2011/0260672 A1* | 10/2011 | Ramu | H02K 21/44 318/701 |
| 2013/0057091 A1* | 3/2013 | Kim | H02K 21/44 310/46 |
| 2013/0113318 A1 | 5/2013 | Nishiyama | |
| 2014/0049124 A1 | 2/2014 | Gandhi et al. | |

FOREIGN PATENT DOCUMENTS

| | | | | |
|---|---|---|---|---|
| JP | H04-200261 A | | 7/1992 | |
| JP | 2002199679 A | * | 7/2002 | |
| JP | 2004-056974 A | | 2/2004 | |
| JP | 2004236369 A | * | 8/2004 | |
| JP | 4207386 B2 | | 1/2009 | |
| JP | 2011-244674 | * | 12/2011 | H02K 1/18 |
| WO | 2013/018245 A1 | | 2/2013 | |

OTHER PUBLICATIONS

Machine Translation CN 103078466 (2013).*
English machine translation of Tojima et al., JP 2011-244674, Dec. 1, 2011.*
Communication dated Sep. 22, 2017 issued in European Patent Application No. 14157693.4, 11 Pages.

* cited by examiner

INDUCTOR TYPE ROTARY MOTOR

CROSS-REFERENCE TO RELATED APPLICATION

This application claims priority to Japanese Application No. 2013-043251, filed Mar. 5, 2013, the entirety of which is incorporated herein by reference.

BACKGROUND

1. Technical Field

The present invention relates to an inductor type rotary motor that can be used in various devices such as an FA device, an OA device, and an in-vehicle device.

2. Description of Related Art

Examples of the inductor type rotary motor include an embedded magnet type inductor motor as disclosed in Specification of Japanese Patent No. 4207386. In the embedded magnet type inductor, a thin sheet-shaped permanent magnet is inserted in an accommodation portion of a magnetic substance yoke, and a coil is magnetized in a rotating direction. In the embedded magnet type inductor motor, a magnetic flux flows to a magnetic gap through the magnetic substance yoke, and thus a magnetic flux density of the magnetic gap can be raised. Accordingly, torque is large, and the inductor motor is highly efficient.

SUMMARY

However, when being compared with a permanent magnet type motor, the inductor type rotary motor disclosed in Specification of Japanese Patent No. 4207386 has an advantage that a used amount of the permanent magnet may be small, but has a disadvantage that torque per size is small, and thus an application range is limited.

An object of the present invention is to provide an inductor type rotary motor which is capable of broadening an application range of a motor and further reducing a used amount of permanent magnets in the same size by improving torque per size.

According to an embodiment of the present invention to accomplish the above-described object, there is provided an inductor type rotary motor of m-phase (m represents an integer of 2 or more). The inductor type rotary motor includes a stator in which distal ends of teeth are circularly disposed, and a rotor having an inductor tooth that faces each of the distal ends of the teeth through a constant gap. The stator includes k·m teeth (k represents an integer of 1 or more), at least one permanent magnet is disposed at each teeth, and adjacent permanent magnets, which belong to teeth adjacent to each other, are disposed in such a manner that different polarities face each other.

According to the inductor type rotary motor according to the present invention, which is configured as described above, since the permanent magnet is disposed at each of the teeth, and adjacent permanent magnets that belong to the teeth adjacent to each other are disposed in such a manner that different polarities face each other, a short-circuit magnetic flux between teeth is reduced, and the short-circuit magnetic flux can be effectively utilized. Accordingly, torque per size is improved, and thus an application range of the motor can be broadened, and a used amount of the permanent magnet can be reduced.

DETAILED DESCRIPTION

Hereinafter, embodiments of an inductor type rotary motor according to the present invention will be described by dividing the embodiments into first to sixth embodiments. In the inductor type rotary motor according to the present invention, consideration is taken into the shape of a distal end of teeth to effectively utilize a short-circuit magnetic flux between teeth, and a permanent magnet is disposed in each tooth in such a manner that predetermined polarities face each other.

First Embodiment

<Configuration of Inductor Type Rotary Motor>

Figure 1:
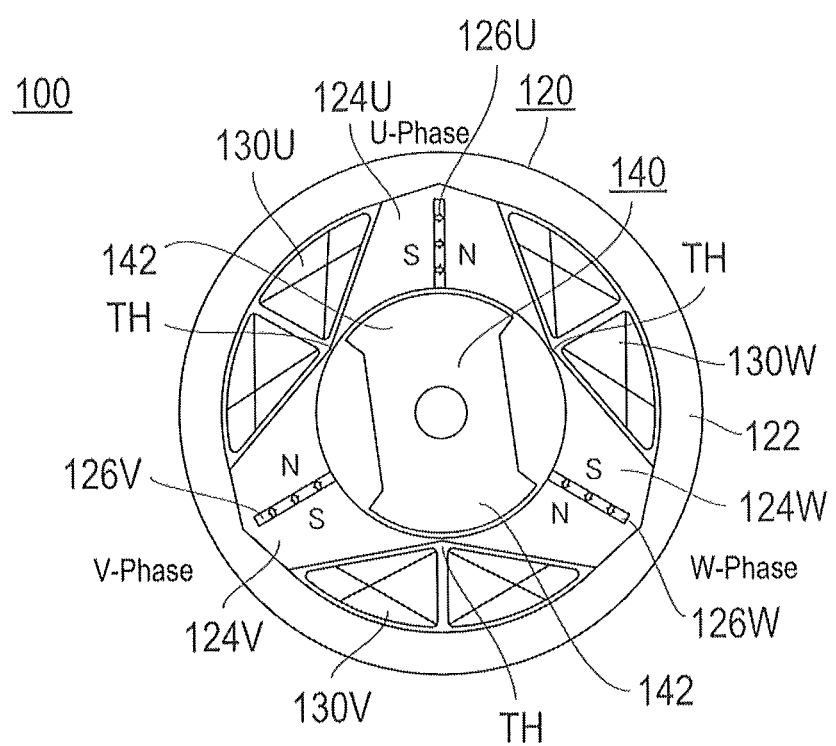
FIG. 1 is a configuration diagram of an inductor type rotary motor according to a first embodiment.

FIG. 1 shows a configuration diagram of the inductor type rotary motor according to the first embodiment. As shown in the drawing, the inductor type rotary motor 100 according to this embodiment includes a stator 120 and a rotor 140.

The stator 120 includes a cylindrical yoke 122, a U-phase tooth 124U, a V-phase tooth 124V, and a W-phase tooth 124W. The respective U-phase tooth 124U, V-phase tooth 124V, and W-phase tooth 124W are circumferentially disposed on an inner circumference side of a yoke 122 at an equal angle of a center angle of 120°. The inductor type rotary motor 100 according to the first embodiment is a three-phase inductor type rotary motor.

A permanent magnet 126U is disposed in the U-phase tooth 124U, a permanent magnet 126V is disposed in the V-phase tooth 124V, and a permanent magnet 126W is disposed in the W-phase tooth 124W. In the inductor type rotary motor 100 according to the first embodiment, one permanent magnet is disposed in each tooth.

The permanent magnets 126U, 126V, and 126W have a long sheet shape. An accommodation hole (reference numeral is omitted) for each of the permanent magnets 126U, 126V, and 126W is formed toward the depth direction of the respective teeth 124U, 124V, and 124W (front and rear direction in the drawing). Each of the permanent magnets 126U, 126V, and 126W is inserted into each of the accommodation holes formed in each of the teeth 124U, 124V, and 124W, and is fixed in the accommodation hole with an adhesive that is allowed to flow into the accommodation hole. The accommodation holes are formed at a constant interval in the plurality of teeth that are adjacent to each other. The permanent magnets 126U, 126V, and 126W are disposed with aligned polarities of S→N, S→N, and S→N in a clockwise direction. In the inductor type rotary motor 100 according to the first embodiment, adjacent permanent magnets that belong to teeth adjacent to each other are disposed in such a manner that different polarities face each other.

A coil 130U is wound around the U-phase tooth 124U, a coil 130V is wound around the V-phase tooth 124V, and a coil 130W is wound around the W-phase tooth 124W.

Distal ends of the respective teeth 124U, 124V, and 124W that face the rotor 140 are circularly disposed. The distal ends of the tooth 124U, the tooth 124V, and the tooth 124W continue through a thin portion TH without disconnection and form a cylindrical space at distal end portions of all of the teeth.

The rotor 140 is a two-pole salient pole type rotor including two inductor teeth 142 that face the distal ends of the teeth through a constant gap. The rotor 140 rotates in the cylindrical space formed at the distal end portions of all of the teeth. A distal end of each of the inductor teeth 142 of the rotor 140 has an arc shape concentric to the cylindrical space formed at the distal end portions of all of the teeth.

<Operation of Inductor Type Rotary Motor>

Figure 2:
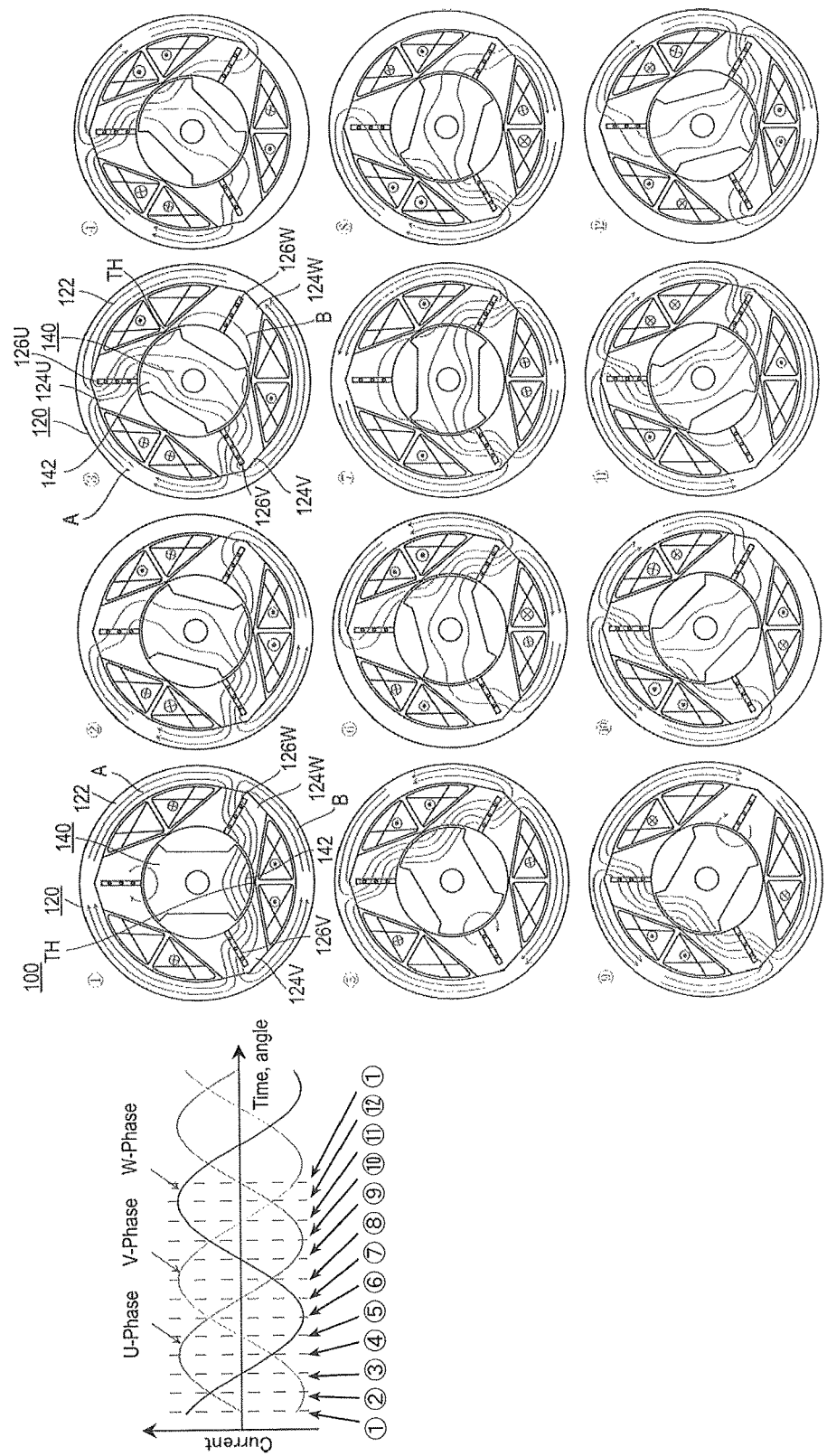
FIG. 2 is a diagram provided for operation explanation of the inductor type rotary motor according to the first embodiment.

FIG. 2 shows a diagram provided for operation explanation of the inductor type rotary motor according to the first embodiment. In the first embodiment, a three-phase alternating current having a phase difference of an electric angle of 120° is allowed to flow to the U-phase coil 130U, the V-phase coil 130V, and the W-phase coil 130W which are shown in FIG. 1. FIG. 2 shows a magnetic flux distribution between the stator 120 and the rotor 140 at that time by dividing the rotation of the rotor 140 with a pitch (stage) of 30°.

As shown in FIG. 2, along with rotation of the rotor 140, a magnetic flux is distributed between the rotor 140 and the stator 120 as indicated by an arrow for each stage. In the case of the inductor type rotary motor 100 according to the first embodiment, when the distal end of one inductor tooth 142 of the rotor 140 is located at a position that spans two adjacent teeth, a magnetic flux from one tooth flows toward the other adjacent tooth through one inductor tooth 142 of the rotor 140. Therefore, a magnetic flux that passes through a space with the adjacent stator does not become a leakage magnetic flux. The rotor 140 generates torque by effectively using the magnetic flux from the stator 120.

In (1) of FIG. 2, a magnetic flux, which is generated by a coil connected to the V-phase and the W-phase, flows through two routes including a first long route A and a second short route B in the order of the tooth 124V→the permanent magnet 126V→the yoke 122→the tooth 124W→the permanent magnet 126W→one inductor tooth 142 of the rotor 140. The tooth 124V and the tooth 124W continue through the thin portion TH, but the magnetic flux does not flow to the thin portion TH. This is because a magnetic flux between permanent magnets, which flows from the permanent magnet 126W to the permanent magnet 126V, flows through the thin portion TH, and thus the thin portion TH enters a magnetic saturation state.

In (3) of FIG. 2, a magnetic flux, which is generated by a coil connected to the U-phase and the V-phase, flows through two routes that are divided, that is, a first route A in the order of the tooth 124V→the permanent magnet 126V→the yoke 122→the tooth 124U→the permanent magnet 126U-f the rotor 140, and a second route B in the order of the tooth 124V→the permanent magnet 126V→the yoke 122→the tooth 124U→the permanent magnet 126U→the rotor 140, and one inductor tooth 142 of the rotor 140→the tooth 124W→the permanent magnet 126W→the other inductor tooth 142 of the rotor 140. The tooth 124U and the tooth 124W, and the tooth 124W and the tooth 124V continue through thin portions TH, respectively, but the magnetic flux does not flow to the thin portions TH. This is because the thin portions TH also enter a magnetic saturation state due to the magnetic flux between the permanent magnets.

As described above, in the inductor type rotary motor 100 according to the first embodiment, since the magnetic flux between adjacent teeth passes through the inductor tooth 142 of the rotor 140, the magnetic flux that is generated by the coil is effectively used and becomes torque that rotates the rotor 140. This is also true of stages other than (1) and (3). In addition, since the adjacent teeth continue through the thin portion TH, a torque variation that occurs in the rotor 140 becomes smooth and thus cogging or torque ripple occurs less.

In the inductor type rotary motor 100 according to the first embodiment, one permanent magnet is disposed at each of the teeth with the same pitch, and adjacent permanent magnets that belong to the teeth adjacent to each other are disposed in such a manner that different polarities face each other. Therefore, a magnetic flux (short-circuit magnetic flux), which short-circuits teeth and tends to pass from the teeth, other than a magnetic flux that flows through the inside of the rotor 140 from each of the teeth can be guided to the rotor 140, and thus large torque can be generated in the rotor 140. In addition, since the teeth are connected by the thin portion TH, it is possible to realize an inductor type rotary motor in which cogging or torque ripple occurs less and which smoothly rotates.

Second Embodiment

<Configuration of Inductor Type Rotary Motor>

Figure 3:
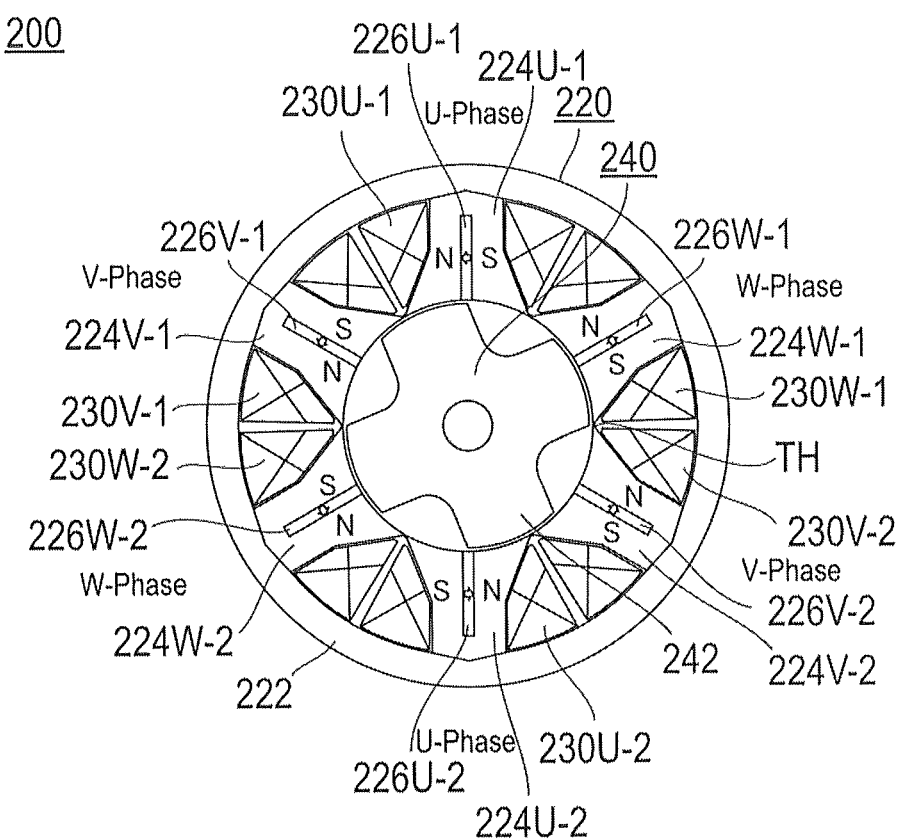
FIG. 3 is a configuration diagram of an inductor type rotary motor according to a second embodiment.

FIG. 3 shows a configuration diagram of an inductor type rotary motor according to a second embodiment. As shown in the drawing, an inductor type rotary motor 200 according to this embodiment includes a stator 220 and a rotor 240.

The stator 220 includes a cylindrical yoke 222, a U-phase teeth 224U-1 and 224U-2, V-phase teeth 224V-1 and 224V-2, and W-phase teeth 224W-1 and 224W-2. The respective U-phase teeth 224U-1 and 224U-2, V-phase teeth 224V-1 and 224V-2, and W-phase teeth 224W-1 and 224W-2 are disposed on an inner circumference side of the yoke 222 at an equal angle of a center angle of 60°. The inductor type rotary motor 200 according to the second embodiment is a three-phase inductor type rotary motor including six teeth.

A permanent magnet 226U-1 is disposed in the U-phase tooth 224U-1, a permanent magnet 226V-1 is disposed in the V-phase tooth 224V-1, and a permanent magnet 226W-1 is disposed in the W-phase tooth 224W-1. In addition, a permanent magnet 226U-2 is disposed in the U-phase tooth 224U-2, a permanent magnet 226V-2 is disposed in the V-phase tooth 224V-2, and a permanent magnet 226W-2 is disposed in the W-phase tooth 224W-2. In the inductor type rotary motor 200 according to the second embodiment, one permanent magnet is disposed in each of the teeth.

The permanent magnets 226U-1, 226U-2, 226V-1, 226V-2, 226W-1, and 226W-2 have a long sheet shape. An accommodation hole (reference numeral is omitted) for each of the permanent magnets 226U-1, 226U-2, 226V-1, 226V-2, 226W-1, and 226W-2 is formed toward the depth direction (front and rear direction in the drawing) of each of the teeth 224U-1, 224U-2, 224V-1, 224V-2, 224W-1, and 224W-2. Each of the permanent magnets 226U-1, 226U-2, 226V-1, 226V-2, 226W-1, and 226W-2 is inserted into the accommodation hole of each of the teeth 224U-1, 224U-2, 224V-1, 224V-2, 224W-1, and 224W-2, and is fixed in the accommodation hole with an adhesive that is allowed to flow into the accommodation hole. The accommodation holes are formed at a constant interval in the plurality of teeth that are adjacent to each other. The permanent magnets 226U-1, 226V-1, 226W-2, 226U-2, 226V-2, and 226W-1 are disposed with aligned polarities of S→N, S→N, S→N, S→N, S→N, S→N in a counter clockwise direction. In the inductor type rotary motor 200 according to the second embodiment, adjacent permanent magnets that belong to teeth adjacent to each other are disposed in such a manner that different polarities face each other.

A coil 230U-1 is wound around the U-phase tooth 224U-1, a coil 230V-1 is wound around the V-phase tooth 224V-1, and a coil 230W-1 is wound around the W-phase tooth 224W-1. In addition, a coil 230U-2 is wound around the U-phase tooth 224U-2, a coil 230V-2 is wound around the V-phase tooth 224V-2, and a coil 230W-2 is wound around the W-phase tooth 224W-2.

Distal ends of the respective teeth 224U-1, 224V-1, 224W-2, 224U-2, 224V-2, and 224W-1 that face the rotor 240 are circularly disposed. The distal ends of the teeth 224U-1, 224V-1, 224W-2, 224U-2, 224V-2, and 224W-1 continue through a thin portion TH without disconnection and form a cylindrical space at distal end portions of all of the teeth.

The rotor 240 is a four-pole salient pole type rotor including four inductor teeth 242 that face the distal ends of the teeth through a constant gap. The rotor 240 rotates in the cylindrical space formed at the distal end portions of all of the teeth. A distal end of each of the inductor teeth 242 of the rotor 240 has an arc shape concentric to the cylindrical space formed at the distal end portions of all of the teeth.

Figure 4A:
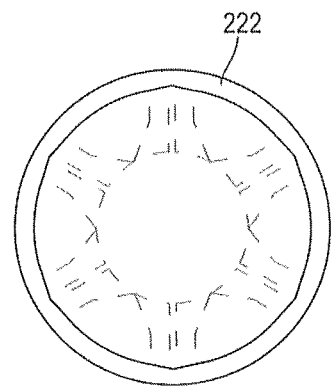
FIG. 4A is a configuration diagram of a yoke of the inductor type rotary motor according to the second embodiment.
Figure 4B:
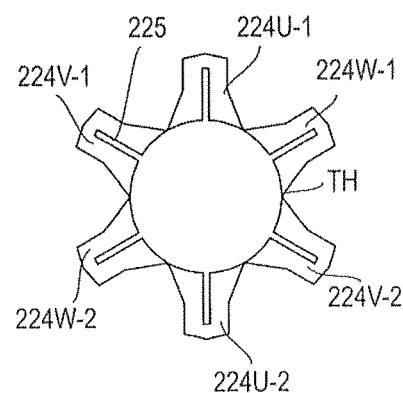
FIG. 4B is a configuration diagram of teeth of the inductor type rotary motor according to the second embodiment.
Figure 4C:
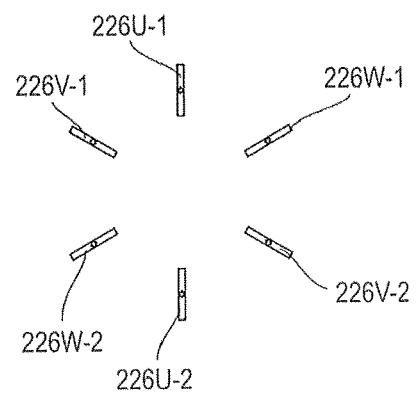
FIG. 4C is a configuration diagram of a permanent magnet that is inserted into the teeth according to the second embodiment.

Next, a specific configuration of the inductor type rotary motor 200 shown in FIG. 3 will be described. FIGS. 4A to 4C show exploded diagrams of the inductor type rotary motor 200 according to the second embodiment, in which FIG. 4A shows a configuration diagram of a yoke, FIG. 4B shows a configuration diagram of teeth, and FIG. 4C shows a configuration diagram of a permanent magnet that is inserted into the teeth.

As shown in FIG. 4A, a yoke 222 of the inductor type rotary motor 200 has a cylindrical shape, an outer circumference has a circular shape, and an inner circumference does not have a complete circular shape to maintain the teeth. As shown in FIG. 4B, the inductor type rotary motor 200 includes six teeth 224V-1, 224U-1, 224W-1, 224V-2, 224U-2, and 224W-2. As shown in FIG. 4C, in each of the teeth, an accommodation hole 225 that accommodates each of the permanent magnets 226V-1, 226U-1, 226W-1, 226V-2, 226U-2, and 226W-2 is opened. In addition, it is preferable to form the yoke 222 and the six teeth 224V-1, 224U-1, 224W-1, 224V-2, 224U-2, and 224W-2 by laminating an electromagnetic steel sheet obtained by punching a thin sheet.

The six teeth 224V-1, 224U-1, 224W-1, 224V-2, 224U-2, and 224W-2 are accommodated inside the yoke 222. The outer circumference side of the teeth 224V-1, 224U-1, 224W-1, 224V-2, 224U-2, and 224W-2, which are accommodated in the yoke 222, comes into contact with an inner circumferential surface of the yoke 222 without a gap. In addition, teeth that are adjacent to each other come into contact with each other at the inner circumference side of the teeth 224V-1, 224U-1, 224W-1, 224V-2, 224U-2, and 224W-2.

When a permanent magnet is accommodated in each of the teeth in such a manner that polarities of the permanent magnets accommodated in the teeth that are adjacent are different from each other in the counter clockwise direction, a magnetic flux of the permanent magnets flows through the thin portion TH that connects the teeth. Therefore, the thin portion TH exhibits a magnetic saturation tendency.

Figure 5A:
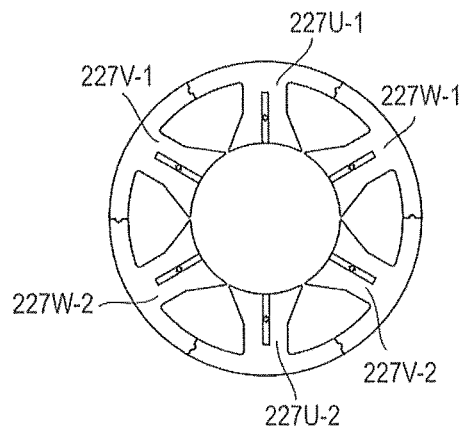
FIG. 5A shows exploded aspects of the teeth of the inductor type rotary motor according to the second embodiment.
Figure 5B:
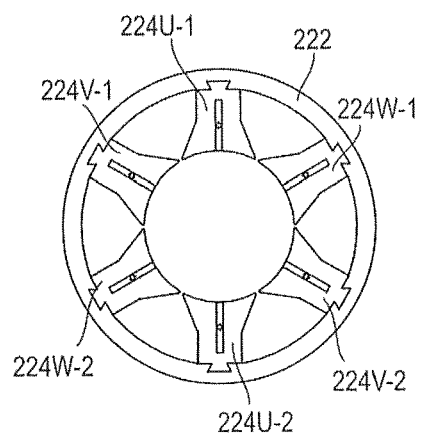
FIG. 5B shows exploded aspects of the teeth of the inductor type rotary motor according to the second embodiment.
Figure 5C:
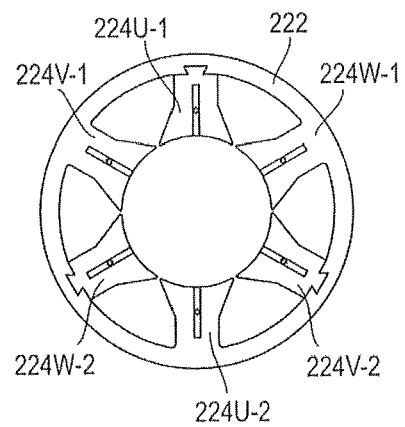
FIG. 5C shows exploded aspects of the teeth of the inductor type rotary motor according to the second embodiment.

FIGS. 5A to 5C show configuration diagrams of the yoke and tooth of the inductor type rotary motor according to the second embodiment, in which FIGS. 5A to 5C show exploded aspects of the teeth.

As shown in FIG. 5A, in the inductor type rotary motor 200, six T-shaped magnetic portions 227V-1, 227U-1, 227W-1, 227V-2, 227U-2, and 227W-2 including the yoke may be connected without providing the thin portion at the distal ends of the teeth. In addition, as shown in FIG. 5B, six I-shaped teeth 224V-1, 224U-1, 224W-1, 224V-2, 224U-2, and 224W-2 may be inserted into the yoke 222. In addition, as shown in FIG. 5C, three I-shaped teeth 224U-1, 224V-2, 224W-2 may be inserted into the yoke 222 in which three teeth 224V-1, 224W-1, and 224U-2 are integrally mounted. It is preferable to form the teeth in FIGS. 5A to 5C using a directional magnetic steel sheet. In this case, it is preferable that a magnetic flux passing direction in the teeth and an axis of easy magnetization of the directional magnetic steel sheet be parallel with each other.

Figure 6:
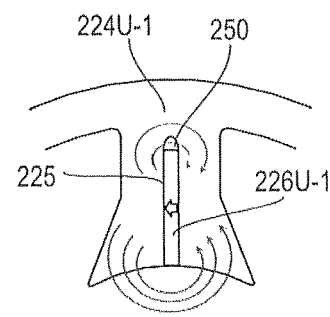
FIG. 6 is a diagram illustrating a core shape of the inductor type rotary motor according to the second embodiment.

FIG. 6 shows a diagram illustrating a core shape of the inductor type rotary motor 200 according to the second embodiment. As shown in FIG. 6, specifically, a shape of the accommodation hole 225 for each of the teeth (for example, 224U-1) shown in the second embodiment is a rectangular shape that extends in the vertical direction of the permanent magnet 226U-1, and a semi-circular void 250 is provided at a distal end. The void 250 prevents the magnetic flux of the permanent magnet 226U-1 from being short-circuited. When the magnetic flux of the permanent magnet 226U-1 is prevented from being short-circuited, a magnetic flux of a gap surface with the rotor 240 can be increased, and thus there is an effect of improving torque of the rotor 240. In addition, in the drawing, the semi-circular void 250 is provided, but the shape of the void that increases a magnetic resistance may be a triangular shape, an elliptical shape, and the like.

<Operation of Inductor Type Rotary Motor>

Figure 7:
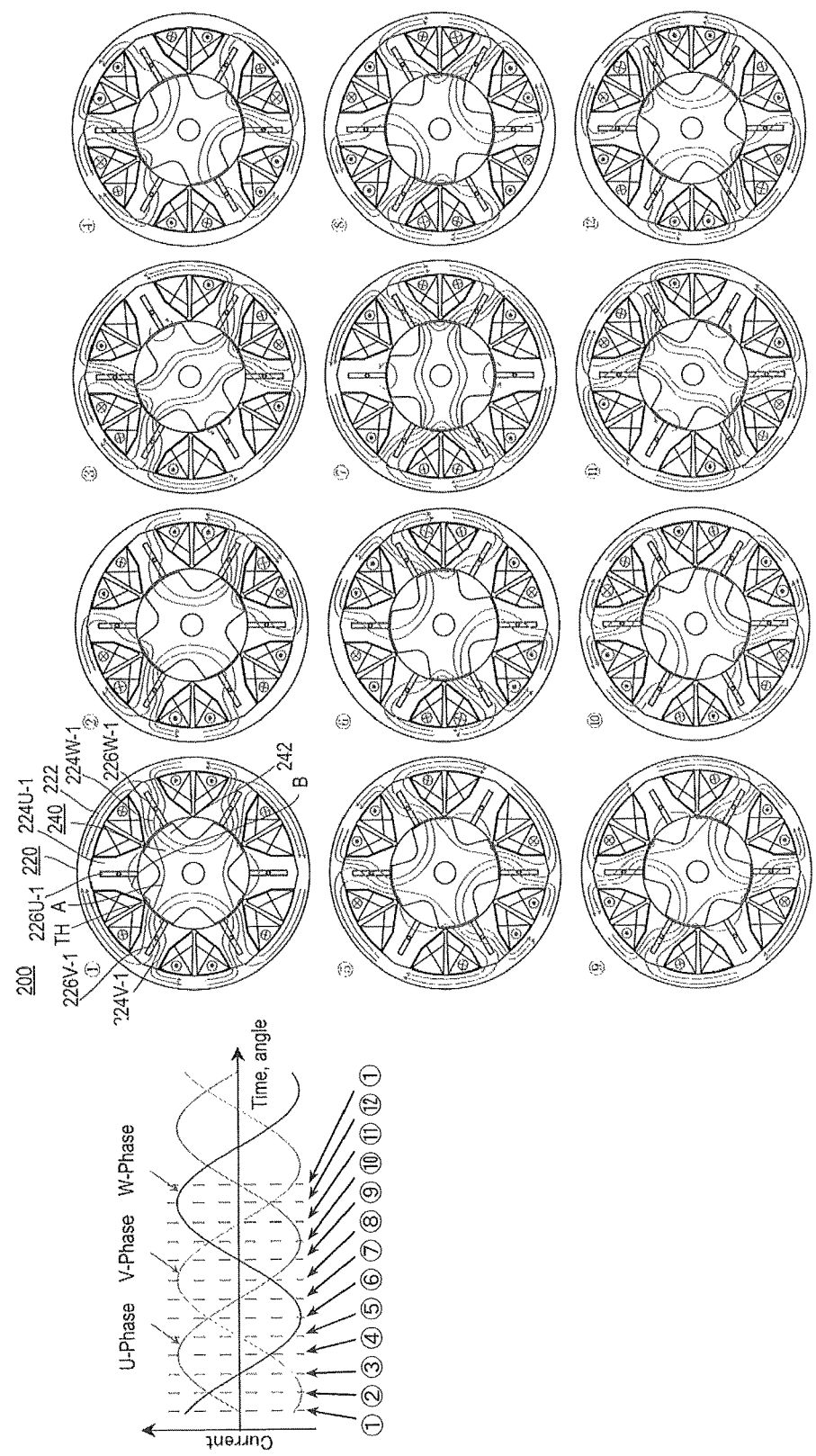
FIG. 7 is a diagram provided for operation explanation of the inductor type rotary motor according to the second embodiment.

FIG. 7 shows a diagram provided for operation explanation of the inductor type rotary motor according to the second embodiment. In the second embodiment, a three-phase alternating current having a phase difference of an electric angle of 120° is allowed to flow to the U-phase coils 230U-1 and 230U-2, the V-phase coils 230V-1 and 230V-2, and the W-phase coils 230W-1 and 230W-2 which are shown in FIG. 3. FIG. 7 shows a magnetic flux distribution between the stator 220 and the rotor 240 at that time by dividing the rotation of the rotor 240 with a pitch of 30°.

As shown in FIG. 7, along with rotation of the rotor 240, a magnetic flux is distributed between the rotor 240 and the stator 220 as indicated by an arrow for each stage. In the case of the inductor type rotary motor 200 according to the second embodiment, when the distal end of one inductor tooth 242 of the rotor 240 is located at a position that spans two adjacent teeth, a magnetic flux from one tooth flows toward the other adjacent tooth through one inductor tooth 242 of the rotor 240. Therefore, the rotor 240 generates torque by effectively using the magnetic flux from the stator 220.

In (1) of FIG. 7, a magnetic flux, which is generated by a coil connected to the V-phase and the W-phase, flows through two routes including a first route A and a second route B in the order of the tooth 224V-1→the permanent magnet 226V-1→the yoke 222→the tooth 224W-1→the permanent magnet 226W-1, two inductor teeth 242 of the rotor 240, and the tooth 224U-1→the permanent magnet 226-1. The tooth 224V-1, the tooth 224U-1, and the tooth 224W-1 continue through the thin portion TH between teeth, but the magnetic flux does not flow to the thin portion TH. This is because a magnetic flux from a permanent magnet of an adjacent tooth flow to the thin portion TH, and thus the thin portion TH enters a magnetic saturation state.

As described above, similar to the inductor type rotary motor 100 according to the first embodiment, in the inductor type rotary motor 200 according to the second embodiment, since the magnetic flux between adjacent teeth also passes through the inductor tooth 242 of the rotor 240, the magnetic flux that is generated by the coil is effectively used and becomes torque that rotates the rotor 240. This is also true of stages other than (1). In addition, since the adjacent teeth continue through the thin portion TH, a torque variation that occurs in the rotor 240 becomes smooth, and thus togging or torque ripple occurs less.

According to the inductor type rotary motor 200 according to the second embodiment, one permanent magnet is disposed at each of the teeth with the same pitch, and adjacent permanent magnets that belong to the teeth adjacent to each other are disposed in such a manner that different polarities face each other. Therefore, a magnetic flux (short-circuit magnetic flux), which short-circuits teeth and tends to pass from the teeth, other than a magnetic flux that flows through the inside of the rotor 240 from each of the teeth can be guided to the inductor tooth 242 of the rotor 240, and thus large torque can be generated in the rotor 240. In addition, the teeth are connected by the thin portion TH, and thus torque that is generated by the rotor 240 becomes smooth, and it is possible to realize an inductor type rotary motor in which cogging or torque ripple occurs less.

Third Embodiment

<Configuration of Inductor Type Rotary Motor>

Figure 8:
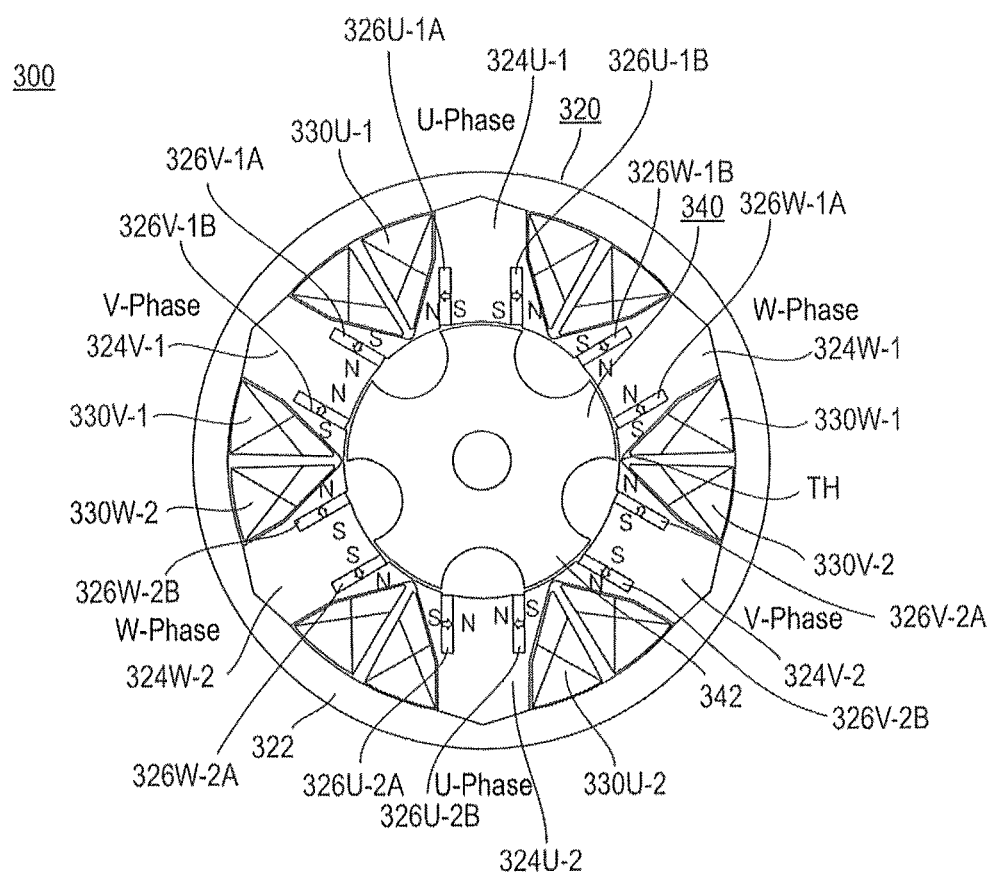
FIG. 8 is a configuration diagram of an inductor type rotary motor according to a third embodiment.

FIG. 8 shows a configuration diagram of an inductor type rotary motor according to a third embodiment. As shown in the drawing, the inductor type rotary motor 300 according to this embodiment includes a stator 320 and a rotor 340.

The stator 320 includes a cylindrical yoke 322, U-phase teeth 324U-1 and 324U-2, V-phase teeth 324V-1 and 324V-2, and W-phase teeth 324W-1 and 324W-2. The respective U-phase teeth 324U-1 and 324U-2, V-phase teeth 324V-1 and 324V-2, and W-phase teeth 324W-1 and 324W-2 are disposed on an inner circumference side of the yoke 322 at an equal angle of a center angle of 60°. The inductor type rotary motor 300 according to the third embodiment is a three-phase inductor type rotary motor including six teeth similar to the inductor type rotary motor 200 according to the second embodiment.

Two permanent magnets 326U-1A and 326U-1B are disposed in the U-phase tooth 324U-1, two permanent magnets 326V-1A and 326V-1B are disposed in the V-phase tooth 324V-1, and two permanent magnets 326W-1A and 326W-1B are disposed in the W-phase tooth 324W-1. In addition, two permanent magnets 326U-2A and 326U-2B are disposed in the U-phase tooth 324U-2, two permanent magnets 326V-2A and 326V-2B are disposed in the V-phase tooth 324V-2, and two permanent magnets 326W-2A and 326W-2B are disposed in the W-phase tooth 324W-2. In the inductor type rotary motor 300 according to the third embodiment, two permanent magnets are disposed in each of the teeth.

The permanent magnets 326U-1A, 326U-1B, 326U-2A, 326U-2B, 326V-1A, 326V-1B, 326V-2A, 326V-2B, 326W-1A, 326W-1B, 326W-2A, and 326W-2B have a long sheet shape. An accommodation hole (reference numeral is omitted) for each of the permanent magnets 326U-1A, 326U-1B, 326U-2A, 326U-2B, 326V-1A, 326V-1B, 326V-2A, 326V-2B, 326W-1A, 326W-1B, 326W-2A, and 326W-2B is formed toward the depth direction (front and rear direction in the drawing) of each of the teeth 324U-1, 324U-2, 324V-1, 324V-2, 324W-1, and 324W-2. Each of the permanent magnets 326U-1A, 326U-1B, 326U-2A, 326U-2B, 326V-1A, 326V-1B, 326V-2A, 326V-2B, 326W-1A, 326W-1B, 326W-2A, and 326W-2B is inserted into the accommodation hole of each of the teeth 324U-1, 324U-2, 324V-1, 324V-2, 324W-1, and 324W-2 and is fixed in the accommodation hole with an adhesive that is allowed to flow into the accommodation hole. The accommodation holes are formed at a constant interval in the plurality of teeth that are adjacent to each other. The permanent magnets 326U-1A, 326U-1B, 326U-2A, 326U-2B, 326V-1A, 326V-1B, 326V-2A, 326V-2B, 326W-1A, 326W-1B, 326W-2A, and 326W-2B are disposed with aligned polarities in such a manner that S→N, N→S, N→S, and N→S are repeated in a counter clockwise direction. In the inductor type rotary motor 300 according to the third embodiment, adjacent permanent magnets that belong to the same tooth are disposed in such a manner that the same polarities face each other, and adjacent permanent magnets that belong to teeth adjacent to each other are disposed in such a manner that different polarities face each other.

A coil 330U-1 is wound around the U-phase tooth 324U-1, a coil 330V-1 is wound around the V-phase tooth 324V-1, and a coil 330W-1 is wound around the W-phase tooth 324W-1. In addition, a coil 330U-2 is wound around the U-phase tooth 324U-2, a coil 330V-2 is wound around the V-phase tooth 324V-2, and a coil 330W-2 is wound around the W-phase tooth 324W-2.

Distal ends of the respective teeth 324U-1, 324V-1, 324W-2, 324U-2, 324V-2, and 324W-1 that face the rotor 340 are circularly disposed. The distal ends of the teeth 324U-1, 324V-1, 324W-2, 324U-2, 324V-2, and 324W-1 continue through a thin portion TH without disconnection and form a cylindrical space at distal end portions of all of the teeth.

The rotor 340 is a five-pole salient pole type rotor including five inductor teeth 342 that face the distal ends of the teeth through a constant gap. The rotor 340 rotates in the cylindrical space formed at the distal end portions of all of the teeth. A distal end of each of the inductor teeth 342 of the rotor 340 has an arc shape concentric to the cylindrical space formed at the distal end portions of all of the teeth.

Figure 9A:
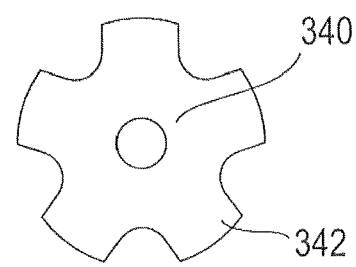
FIG. 9A is a diagram illustrating a configuration of a rotor of the inductor type rotary motor according to the third embodiment.
Figure 9B:
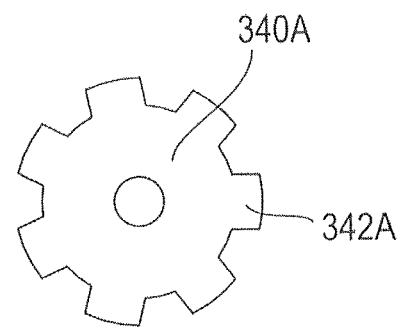
FIG. 9B is a diagram illustrating a configuration of a rotor of the inductor type rotary motor according to the third embodiment.

FIGS. 9A and 9B show diagrams illustrating a configuration of a rotor of the inductor type rotary motor 300 according to the third embodiment. As shown in FIG. 9A, the rotor 340 shown in FIG. 8 includes five-pole inductor teeth 342 that are disposed by shifting a center angle by 72°. In the rotor of the inductor type rotary motor 300 according to this embodiment, as shown in FIG. 9B, seven-pole inductor teeth 342A, which are disposed by shifting the center angle by 51°, may be provided instead of the rotor having five-pole inductor teeth 342 as shown in FIG. 9A.

<Operation of Inductor Type Rotary Motor>

Figure 10:
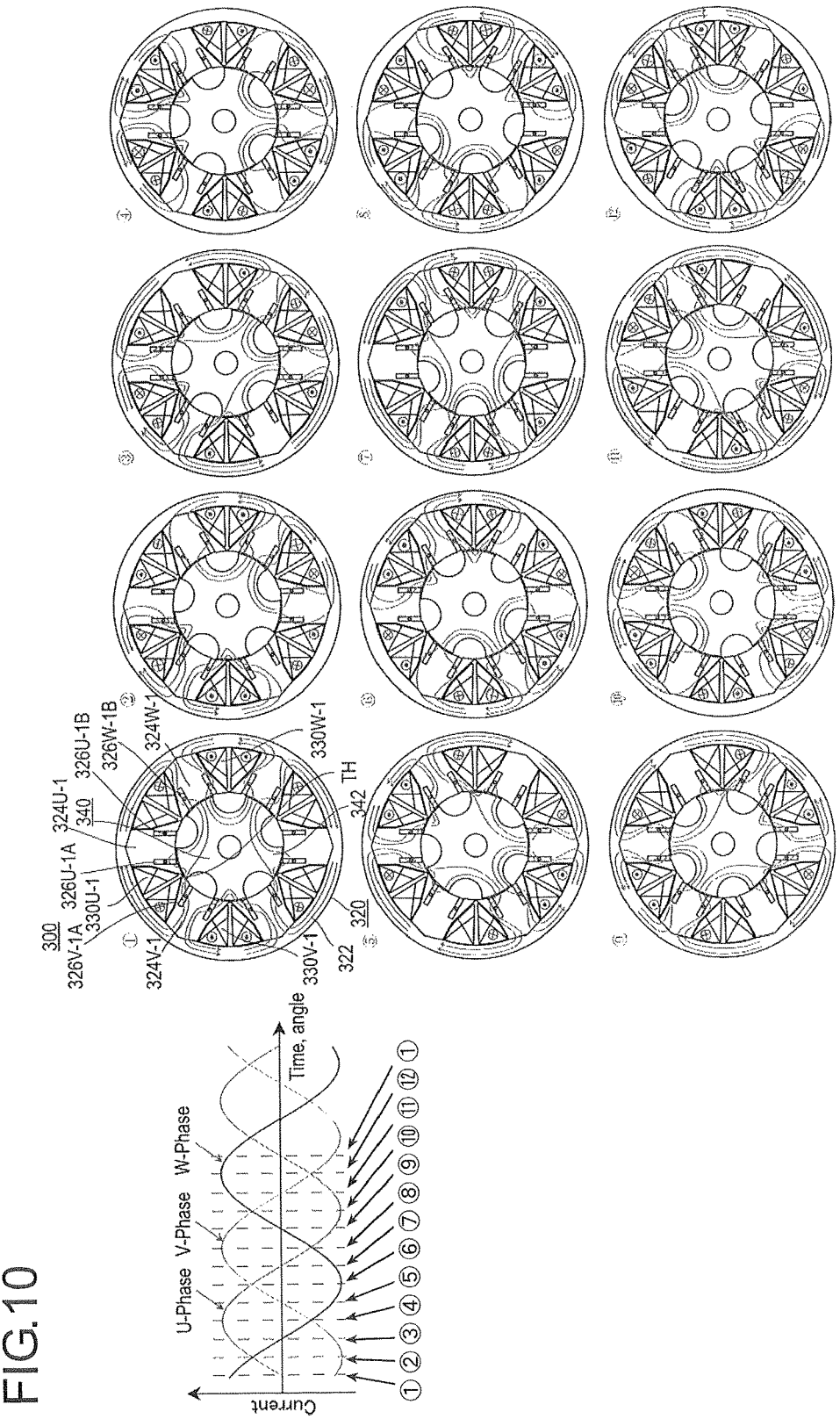
FIG. 10 is a diagram provided for operation explanation of the inductor type rotary motor according to the third embodiment.

FIG. 10 shows a diagram provided for operation explanation of the inductor type rotary motor according to the third embodiment. In the third embodiment, a three-phase alternating current having a phase difference of an electric angle of 120° is allowed to flow to the U-phase coils 330U-1 and 330U-2, the V-phase coils 330V-1 and 330V-2, and the W-phase coils 330W-1 and 330W-2 which are shown in FIG. 8. FIG. 10 shows a magnetic flux distribution between the stator 320 and the rotor 340 at that time by dividing the rotation of the rotor 340 with a pitch of 30°.

As shown in FIG. 10, along with rotation of the rotor 340, a magnetic flux is distributed between the rotor 340 and the stator 320 as indicated by an arrow for each stage. In the case of the inductor type rotary motor 300 according to the third embodiment, when the distal end of one inductor tooth 342 of the rotor 340 is located at a position that spans two adjacent teeth, a magnetic flux from one tooth flows toward the other adjacent tooth through one inductor tooth 342 of the rotor 340. Therefore, the rotor 340 generates torque by effectively using the magnetic flux from the stator 320.

In (1) of FIG. 10, a magnetic flux, which is generated by a coil connected to the V-phase and the W-phase, flows to tooth 324V-1→the yoke 322→the tooth 324W-1→the permanent magnet 326W-1→the inductor tooth 342→the rotor 340→the permanent magnet 326V-2B and the inductor tooth 342→the tooth 324U-1→the permanent magnet 326U-1A→the inductor tooth 342→the permanent magnet 326V-2B. The tooth 324V-1, the tooth 324U-1, and the tooth 324W-1 continue through the thin portion TH between teeth, but the magnetic flux does not flow to the thin portion TH. This is because in each of the teeth, two permanent magnets are disposed on a coil side, and adjacent permanent magnets that belong to teeth that are adjacent to each other are disposed with the thin portion TH interposed therebetween, and thus a magnetic flux flows to the thin portion TH from a permanent magnet of an adjacent tooth, and the thin portion TH enters a magnetic saturation state.

As described above, similar to the inductor type rotary motors 100 and 200 according to the first and second embodiments, in the inductor type rotary motor 300 according to the third embodiment, since the magnetic flux between adjacent teeth also passes through the inductor tooth 342 of the rotor 340, the magnetic flux that is generated by the coil is effectively used and becomes torque that rotates the rotor 340. This is also true of stages other than (1). In addition, since adjacent teeth continue through the thin portion TH, a torque variation that occurs in the rotor 340 becomes smooth, and cogging or torque ripple occurs less.

According to the inductor type rotary motor 300 according to the third embodiment, two permanent magnets are disposed at each of the teeth, and adjacent permanent magnets that belong to the teeth adjacent to each other are disposed in such a manner that different polarities face each other, and adjacent permanent magnets that belong to the same tooth are disposed in such a manner that the same polarities face each other. Therefore, a magnetic flux (short-circuit magnetic flux), which short-circuits teeth and tends to pass from the teeth, other than a magnetic flux that flows through the inside of the rotor 340 from each of the teeth can be guided to the inductor tooth 342 of the rotor 340, and thus large torque can be generated in the rotor 340. In addition, the teeth are connected by the thin portion TH, and thus torque that is generated by the rotor 340 becomes smooth, and it is possible to realize an inductor type rotary motor in which cogging or torque ripple occurs less.

[First Modification Example of Third Embodiment]
<Configuration of Inductor Type Rotary Motor>

Figure 11:
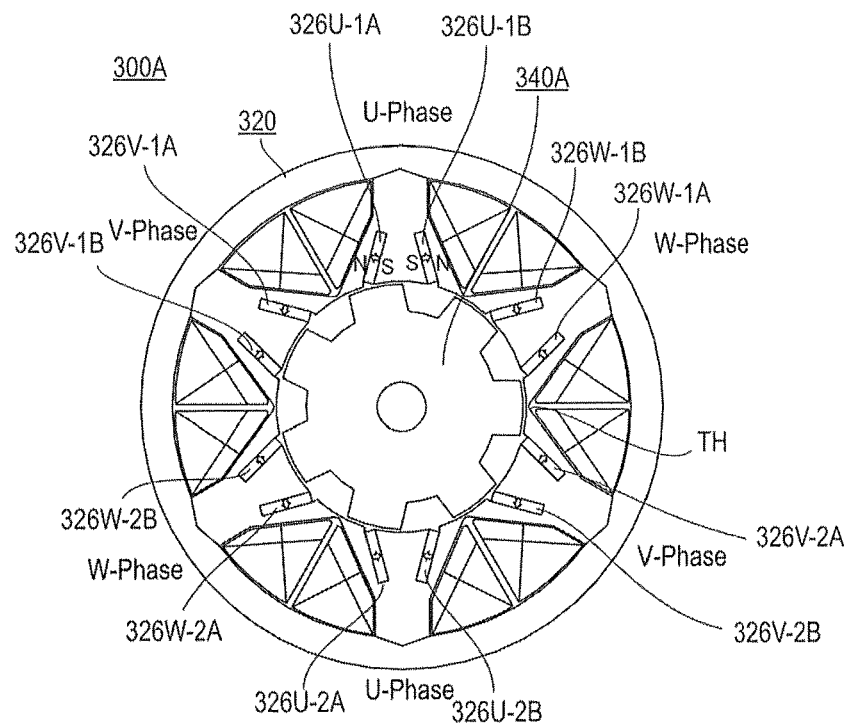
FIG. 11 is a configuration diagram of an inductor type rotary motor according to a first modification example of the third embodiment.

FIG. 11 shows a configuration diagram of an inductor type rotary motor according to the first modification example of the third embodiment. The majority of the inductor type rotary motor 300A shown in FIG. 11 is the same as the inductor type rotary motor 300 according to the third embodiment which is shown in FIG. 8. The inductor type rotary motor 300A is different from the inductor type rotary motor 300 in that as shown in FIG. 11, the rotor 340A shown in FIG. 9B is used as the rotor, and the permanent magnets 326U-1A, 326U-1B, 326U-2A, 326U-2B, 326V-1A, 326V-1B, 326V-2A, 326V-2B, 326W-1A, 326W-1B, 326W-2A, and 326W-2B are disposed in an inverted V shape according to the contour of the coil. That is, at least one permanent magnet of each of the teeth is disposed in an inclined manner to be gradually close to the other permanent magnet.

When the permanent magnets are disposed in the inverted V shape as shown in FIG. 11 instead of being disposed to be parallel with a longitudinal direction of the teeth as shown in FIG. 8, a magnetic flux that is generated by a coil is allowed to uniformly act on each of the permanent magnets, and thus a shape of the magnetic flux that is distributed between the rotor 340A and the stator 320 becomes slightly different from that shown in FIG. 10.

<Operation of Inductor Type Rotary Motor>

Figure 12:
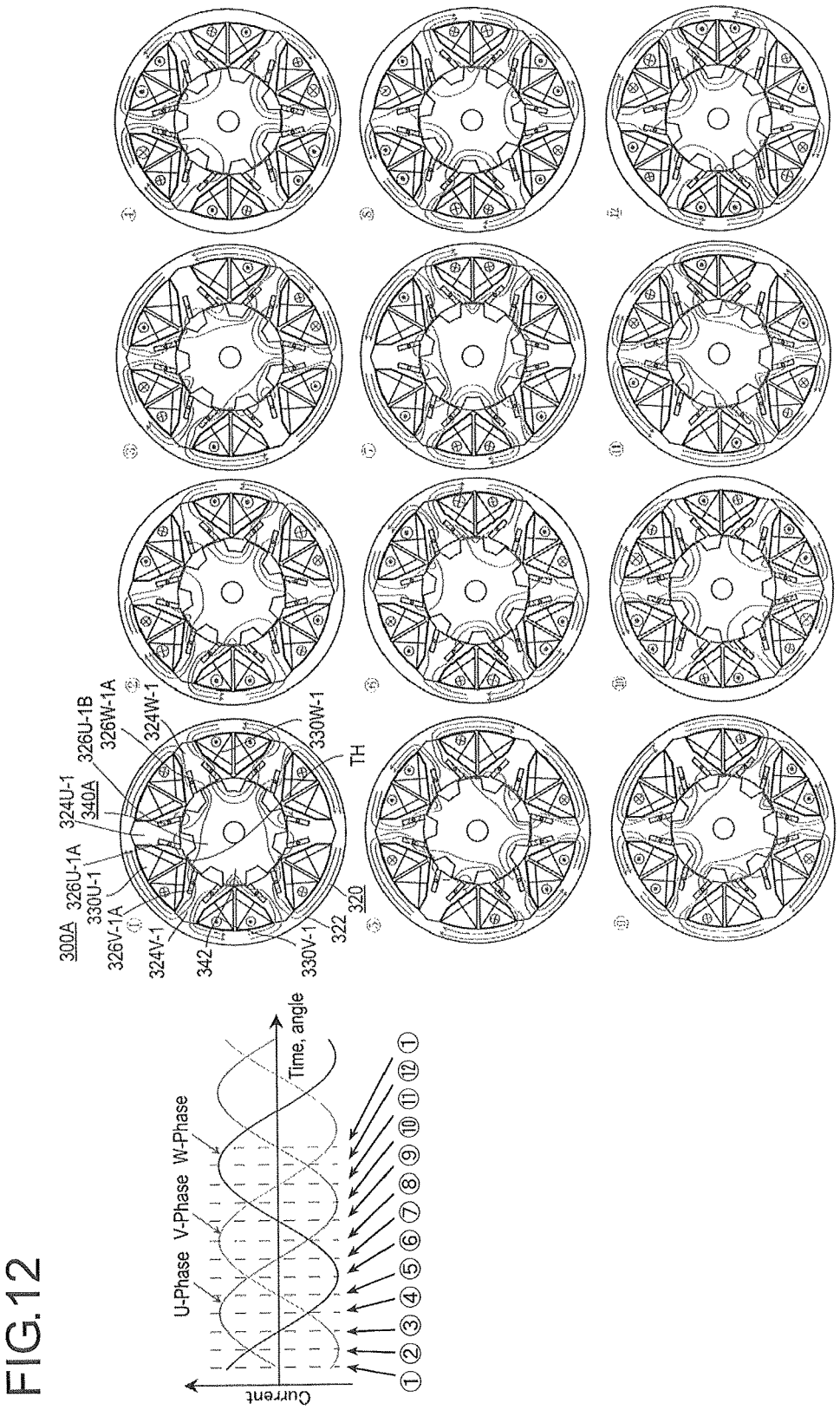
FIG. 12 is a diagram provided for operation explanation of the inductor type rotary motor according to the first modification example of the third embodiment.

FIG. 12 shows a diagram provided for operation explanation of the inductor type rotary motor according to the first modification example of the third embodiment. In the first modification example of the third embodiment, a three-phase alternating current having a phase difference of an electric angle of 120° is also allowed to flow to coils corresponding to the U-phase coils 330U-1 and 330U-2, the V-phase coils 330V-1 and 330V-2, and the W-phase coil 330W-1 and 330W-2 which are shown in FIG. 8. FIG. 12 shows a magnetic flux distribution between the stator 320 and the rotor 340A at that time by dividing the rotation of the rotor 340A with a pitch of 30°.

As shown in FIG. 12, along with rotation of the rotor 340A, a magnetic flux is distributed between the rotor 340A and the stator 320 as indicated by an arrow for each stage. In the case of the inductor type rotary motor 300A according to the first modification example of the third embodiment, when the distal end of one inductor tooth 342 of the rotor 340A is located at a position that spans two adjacent teeth, a magnetic flux from one tooth flows toward the other adjacent tooth through one inductor tooth 342 of the rotor 340A. Therefore, the rotor 340A generates torque by effectively using the magnetic flux from the stator 320. A shape of a magnetic flux distribution of each stage, which is generated by the coils 330V-1 and 330W-1 connected to the V-phase and the W-phase, is similar to FIG. 10 and the magnetic flux distribution has a shape as shown in FIG. 12.

As described above, similar to the inductor type rotary motors 100, 200, and 300 according to the first to third embodiments, in the inductor type rotary motor 300A according to the first modification example of the third embodiment, since the magnetic flux between adjacent teeth also passes through the inductor tooth 342 of the rotor 340A, the magnetic flux that is generated by the coil is effectively used and becomes torque that rotates the rotor 340A. This is also true of stages other than (1). In addition, since adjacent teeth continue through the thin portion TH, and the permanent magnet is disposed in the inverted V shaped, it is possible to make the maximum torque large. On the other hand, torque variation that occurs in the rotor 340A becomes smooth, and cogging or torque ripple occurs less.

[Second Modification Example of Third Embodiment]
<Configuration of Inductor Type Rotary Motor>

Figure 13:
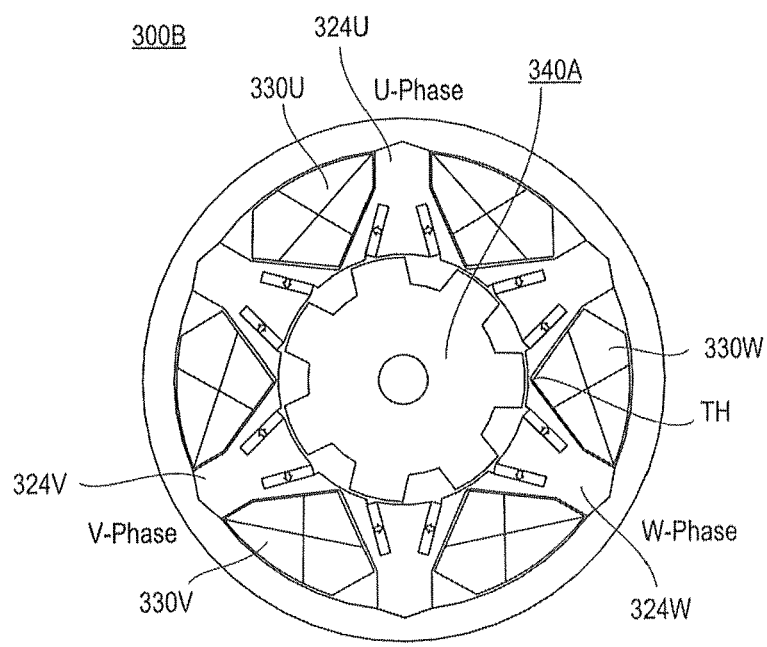
FIG. 13 is a configuration diagram of an inductor type rotary motor according to a second modification example of the third embodiment.

FIG. 13 shows a configuration diagram of an inductor type rotary motor according to the second modification example of the third embodiment. The inductor type rotary motor 300B shown in FIG. 13 is different from the inductor type rotary motor 300A shown in FIG. 11 in a coil winding type.

In the inductor type rotary motor 300A shown in FIG. 11, the coil is wound around each of the teeth. In the inductor type rotary motor 300B shown in FIG. 13, a coil 330U is wound around a tooth 324U to form a U-phase, a coil 330V is wound around a tooth 324V to form a V-phase, and a coil 330W is wound around a tooth 324W to form a W-phase.

<Operation of Inductor Type Rotary Motor>

The operation of the inductor type rotary motor 300B shown in FIG. 13 is approximately the same as that of the inductor type rotary motor 300A shown in FIG. 11. Similar to the inductor type rotary motors 100, 200, and 300 according to the first to third embodiments, in the inductor type rotary motor 300B according to the second modification example of the third embodiment, a magnetic flux between adjacent teeth passes through the inductor tooth 342 of the rotor 340A without passing through the thin portion TH. Therefore, the magnetic flux that is generated by the coil is effectively used and becomes torque that rotates the rotor 340A.

Fourth Embodiment

<Configuration of Inductor Type Rotary Motor>

Figure 14:
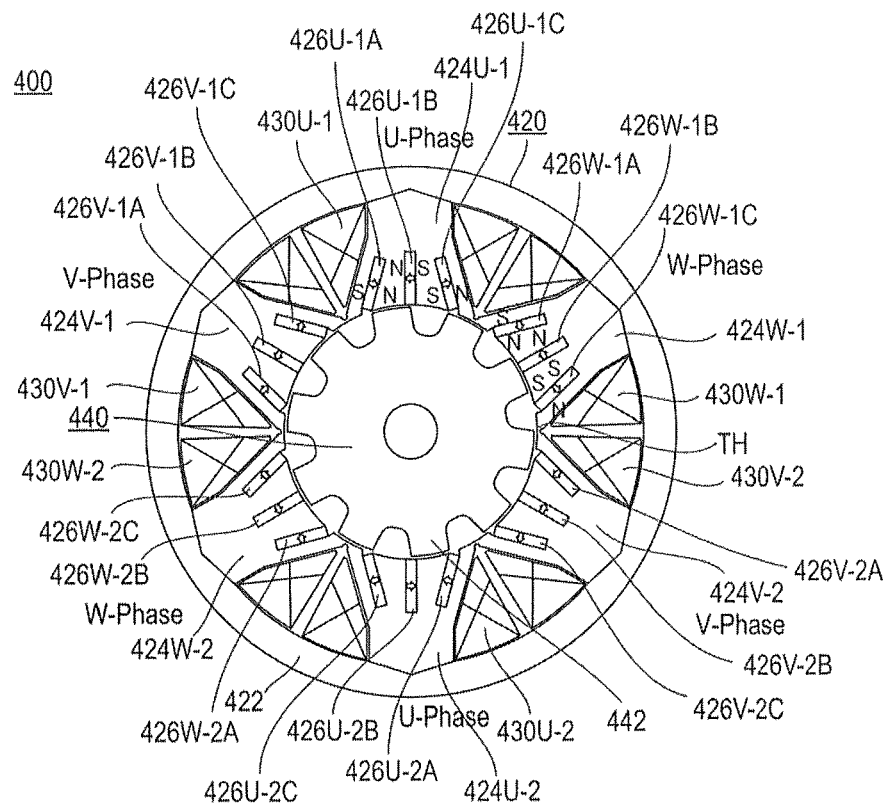
FIG. 14 is a configuration diagram of an inductor type rotary motor according to a fourth embodiment.

FIG. 14 shows a configuration diagram of an inductor type rotary motor according to a fourth embodiment. As shown in the drawing, the inductor type rotary motor 400 according to this embodiment includes a stator 420 and a rotor 440.

The stator 420 includes a cylindrical yoke 422, U-phase teeth 424U-1 and 424U-2, V-phase teeth 424V-1 and tooth 424V-2, and W-phase teeth 424W-1 and 424W-2. The respective U-phase teeth 424U-1 and 424U-2, V-phase teeth 424V-1 and tooth 424V-2, and W-phase teeth 424W-1 and 424W-2 are disposed on an inner circumference side of the yoke 422 at an equal angle of a center angle of 60°. The inductor type rotary motor 400 according to the fourth embodiment is a three-phase inductor type rotary motor including six teeth.

Three permanent magnets 426U-1A, 426U-1B, and 426U-1C are disposed in a U-phase tooth 424U-1, three permanent magnets 426V-1A, 426V-1B, and 426V-1C are disposed in a V-phase tooth 424V-1, and three permanent magnets 426W-1A, 426W-1B, and 426W-1C are disposed in a W-phase tooth 424W-1. In addition, three permanent magnets 426U-2A, 426U-2B, and 426U-2C are disposed in a U-phase tooth 424U-2, three permanent magnets 426V-2A, 426V-2B, and 426V-2C are disposed in a V-phase tooth 424V-2, and three permanent magnets 426W-2A, 426W-2B, and 426W-2C are disposed in a W-phase tooth 424W-2. In the inductor type rotary motor 400 according to the fourth embodiment, three permanent magnets are disposed in each of the teeth.

The permanent magnets 426U-1A, 426U-1B, 426U-1C, 426U-2A, 426U-2B, 426U-2C, 426V-1A, 426V-1B, 426V-1C, 426V-2A, 426V-2B, 426V-2C, 426W-1A, 426W-1B, 426W-1C, 426W-2A, 426W-2B, and 426W-2C have a long sheet shape.

An accommodation hole (reference numeral is omitted) for each of the permanent magnets 426U-1A, 426U-1B, 426U-1C, 426U-2A, 426U-2B, 426U-2C, 426V-1A, 426V-1B, 426V-1C, 426V-2A, 426V-2B, 426V-2C, 426W-1A, 426W-1B, 426W-1C, 426W-2A, 426W-2B, and 426W-2C is formed toward the depth direction (front and rear direction in the drawing) of each of the teeth 424U-1, 424U-2, 424V-1, 424V-2, 424W-1, and 424W-2.

Each of the permanent magnets 426U-1A, 426U-1B, 426U-1C, 426U-2A, 426U-2B, 426U-2C, 426V-1A, 426V-1B, 426V-1C, 426V-2A, 426V-2B, 426V-2C, 426W-1A, 426W-1B, 426W-1C, 426W-2A, 426W-2B, 426W-2C is inserted into the accommodation hole of each of teeth 424U-1, 424U-2, 424V-1, 424V-2, 424W-1, and 424W-2, and is fixed in the accommodation hole with an adhesive that is allowed to flow into the accommodation hole.

The permanent magnets 426U-1A, 426U-1C, 426U-2A, 426U-2C, 426V-1A, 426V-1C, 426V-2A, 426V-2C, 426W-1A, 426W-1C, 426W-2A, and 426W-2C disposed with aligned polarities in such a manner that S→N is repeated in a counter clockwise direction. In addition, the permanent magnets 426U-1B, 426U-2B, 426V-1B, 426V-2B, 426W-1B, and 426W-2B are disposed with aligned polarities in such a manner that N→S is repeated in a counter clockwise direction. Therefore, a permanent magnet that is interposed at the center of each of the teeth receives a repulsive force from permanent magnets that are located at both sides. For example, in the tooth 424U-1, the polarity of the permanent magnet 426U-1B that is located at the center of the tooth becomes opposite to the polarity of the permanent magnets 426U-1A and 426U-1C that are located at both sides, and thus the permanent magnet 426U-1B receives a repulsive force from the permanent magnets 426U-1A and 426U-1C.

A coil 430U-1 is wound around the U-phase tooth 424U-1, a coil 430V-1 is wound around the V-phase tooth 424V-1, and a coil 430W-1 is wound around the W-phase tooth 424W-1. In addition, a coil 430U-2 is wound around the U-phase tooth 424U-2, a coil 430V-2 is wound around the V-phase tooth 424V-2, and a coil 430W-2 is wound around the W-phase tooth 424W-2.

Distal ends of the respective teeth 424U-1, 424V-1, 424W-2, 424U-2, 424V-2, and 424W-1 that face the rotor 440 are circularly disposed. The distal ends of the teeth 424U-1, 424V-1, 424W-2, 424U-2, 424V-2, and 424W-1 continue through a thin portion TH without disconnection and form a cylindrical space at distal end portions of all of the teeth.

The rotor 440 is a ten-pole salient pole type rotor including ten inductor teeth 442 that face the distal ends of the teeth through a constant gap. The rotor 440 rotates in the cylindrical space formed at the distal end portions of all of the teeth. A distal end of each of the inductor teeth 442 of the rotor 440 has an arc shape concentric to the cylindrical space formed at the distal end portions of all of the teeth.

<Operation of Inductor Type Rotary Motor>

Similar to the inductor type rotary motors 100, 200, and 300 according to the first to third embodiments, in the inductor type rotary motor 400 according to the fourth embodiment, the three permanent magnets that are disposed in each of the teeth block a magnetic flux that tends to flow to the thin portion TH that is present between the teeth. Therefore, a magnetic flux from one tooth flows toward the other adjacent tooth through one inductor tooth 442 of the rotor 440. Accordingly, the rotor 440 generates torque by effectively using the magnetic flux from the stator 420.

According to the inductor type rotary motor 400 according to the fourth embodiment, three permanent magnets are disposed at each of the teeth, and adjacent permanent magnets that belong to the teeth adjacent to each other are disposed in such a manner that different polarities face each other, and adjacent permanent magnets that belong to the same tooth are disposed in such a manner that the same polarities face each other. Therefore, a magnetic flux (short-circuit magnetic flux), which short-circuits teeth and tends to pass from the teeth, other than a magnetic flux that flows through the inside of the rotor 440 from each of the teeth can be guided to the inductor tooth 442 of the rotor 440, and thus large torque can be generated in the rotor 440. In addition, the teeth are connected by the thin portion TH, and thus torque that is generated by the rotor 440 becomes smooth, and it is possible to realize an inductor type rotary motor in which cogging or torque ripple occurs less.

[First Modification Example of Fourth Embodiment]
<Configuration of Inductor Type Rotary Motor>

Figure 15:
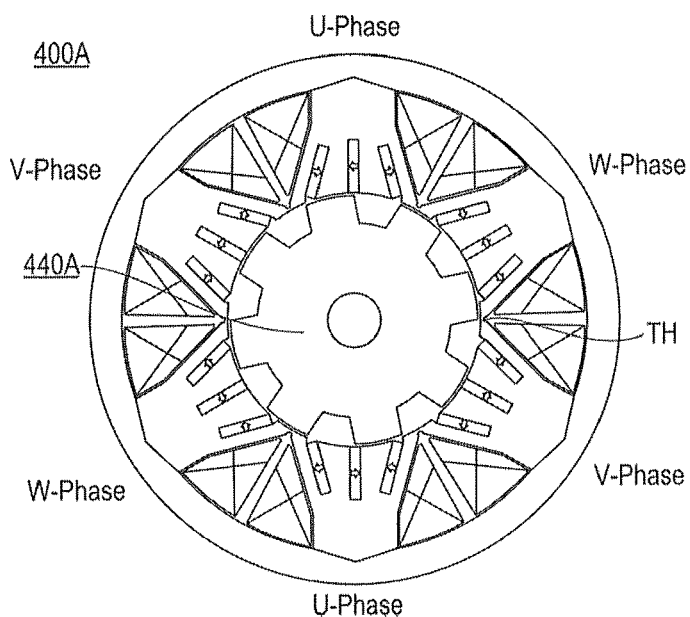
FIG. 15 is a configuration diagram of an inductor type rotary motor according to a first modification example of the fourth embodiment.

FIG. 15 shows a configuration diagram of an inductor type rotary motor according to the first modification example of the fourth embodiment. The inductor type rotary motor 400A shown in FIG. 15 is different from the inductor type rotary motor 400 shown in FIG. 14 in the number of poles of the rotor.

The inductor type rotary motor 400 shown in FIG. 14 is a ten-pole rotor 440, but the inductor type rotary motor 400A shown in FIG. 15 is an eight-pole rotor 440A. The other configurations are substantially the same as that of the inductor type rotary motor 400 shown in FIG. 14.

<Operation of Inductor Type Rotary Motor>

The operation of the inductor type rotary motor 400A shown in FIG. 15 is substantially the same as that of the inductor type rotary motor 400 shown in FIG. 14. The operation of the thin portion TH between the teeth is also substantially the same in each case.

[Second Modification Example of Fourth Embodiment]
<Configuration of Inductor Type Rotary Motor>

Figure 16:
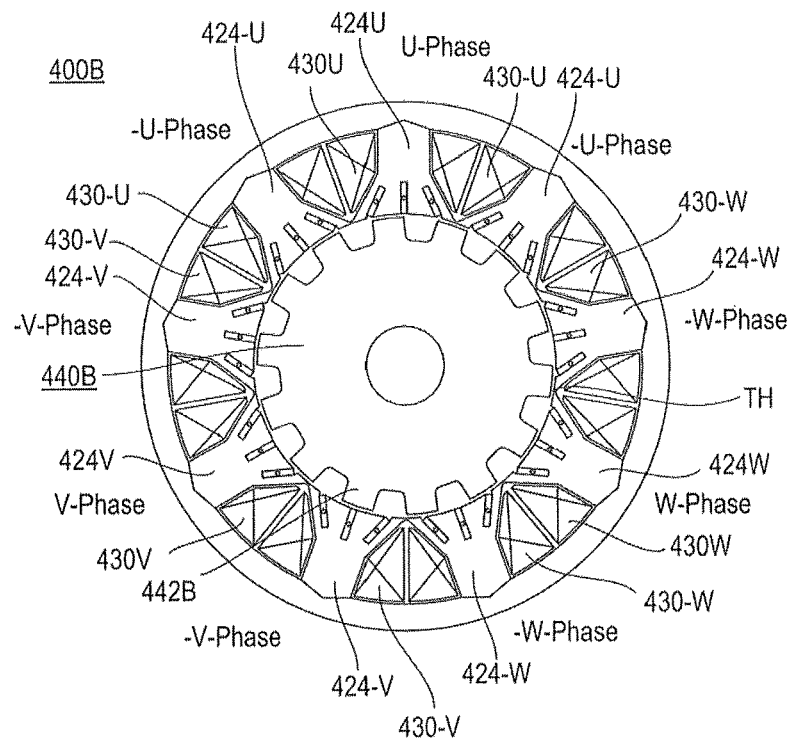
FIG. 16 is a configuration diagram of an inductor type rotary motor according to a second modification example of the fourth embodiment.

FIG. 16 shows a configuration diagram of an inductor type rotary motor according to the second modification example of the fourth embodiment. The inductor type rotary motor 400B shown in FIG. 16 is different from the inductor type rotary motor 400 shown in FIG. 14 in the number of teeth, a method of allowing a current to flow to the coil, and the number of poles of the rotor.

The inductor type rotary motor 400B includes nine teeth including a tooth 424U and two teeth 424-U as U-phase teeth, a tooth 424V and two teeth 424-V as V-phase teeth, and a tooth 424W and two teeth 424-W as W-phase teeth. Accordingly, the respective teeth are disposed at an equal angle of a center angle of 40°. The inductor type rotary motor 400B according to the second modification example of the fourth embodiment is a three-phase inductor type rotary motor including nine teeth.

A U-phase voltage is applied to the tooth 424U, and a –U-phase voltage is applied to the two teeth 424-U. In addition, a V-phase voltage is applied to the tooth 424V, and a –V-phase voltage is applied to the two teeth 424-V. In addition, a W-phase voltage is applied to the tooth 424W, and a –W-phase voltage is applied to the two teeth 424-W.

The rotor 440B is a fourteen-pole rotor including fourteen inductor teeth 442B. The above-described configurations are different from that of the inductor type rotary motor 400 shown in FIG. 14, and the other configurations are the same in each case.

<Operation of Inductor Type Rotary Motor>

The operation of the inductor type rotary motor 400B shown in FIG. 16 is substantially the same as that of the inductor type rotary motor 400 shown in FIG. 14. The operation of the thin portion TH between the teeth is also substantially the same in each case.

[Third Modification Example of Fourth Embodiment]
<Configuration of Inductor Type Rotary Motor>

Figure 17:
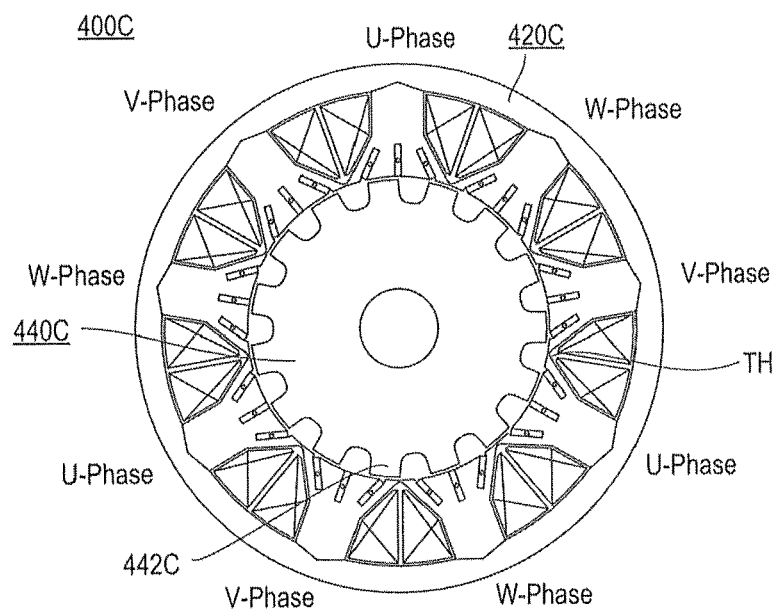
FIG. 17 is a configuration diagram of an inductor type rotary motor according to a third modification example of the fourth embodiment.

FIG. 17 shows a configuration diagram of an inductor type rotary motor according to the third modification example of the fourth embodiment. The inductor type rotary motor 400C shown in FIG. 17 is different from the inductor type rotary motor 400B shown in FIG. 16 in a method of allowing a current to flow to the coil and the number of poles of the rotor.

A configuration of the teeth of the inductor type rotary motor 400C is substantially the same as that of the inductor type rotary motor 400B shown in FIG. 16. A three-phase voltage of a U-phase, a V-phase, and a W-phase is applied to each of the teeth.

The rotor 440C is a fifteen-pole rotor including fifteen inductor teeth 442C. The above-described configurations are different from that of the inductor type rotary motor 400B shown in FIG. 16, and the other configurations are substantially the same in each case.

<Operation of Inductor Type Rotary Motor>

The operation of the inductor type rotary motor 400C shown in FIG. 17 is substantially the same as that of the inductor type rotary motor 400B shown in FIG. 16. The operation of the thin portion TH between the teeth is also substantially the same in each case.

[Fourth Modification Example of Fourth Embodiment]
<Configuration of Inductor Type Rotary Motor>

Figure 18:
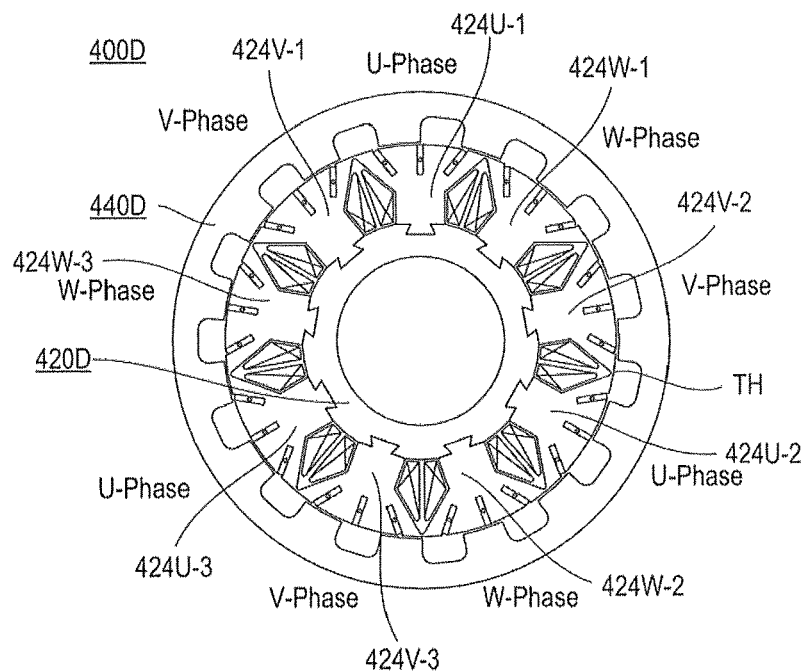
FIG. 18 is a configuration diagram of an inductor type rotary motor according to a fourth modification example of the fourth embodiment.

FIG. 18 shows a configuration diagram of an inductor type rotary motor according to the fourth modification example of the fourth embodiment. The inductor type rotary motor 400D shown in FIG. 18 is configured in such a manner that the rotor 440C and the yoke 420C of the inductor type rotary motor 400C shown in FIG. 17 are disposed to be switched from each other.

Three permanent magnets that are provided to each of the teeth are disposed on a rotor 440D side, and the thin portion TH between the teeth is also provided on the rotor 440D side. The yoke 420D fixes all of the teeth on an inner circumference side.

<Operation of Inductor Type Rotary Motor>

The operation of the inductor type rotary motor 400D shown in FIG. 18 is substantially the same as that of the inductor type rotary motor 400B shown in FIG. 16 except that the rotor 440D rotates on an outer circumference side of the teeth. The operation of the thin portion TH between the teeth is also substantially the same in each case.

[Fifth Modification Example of Fourth Embodiment]
<Configuration of Inductor Type Rotary Motor>

Figure 19:
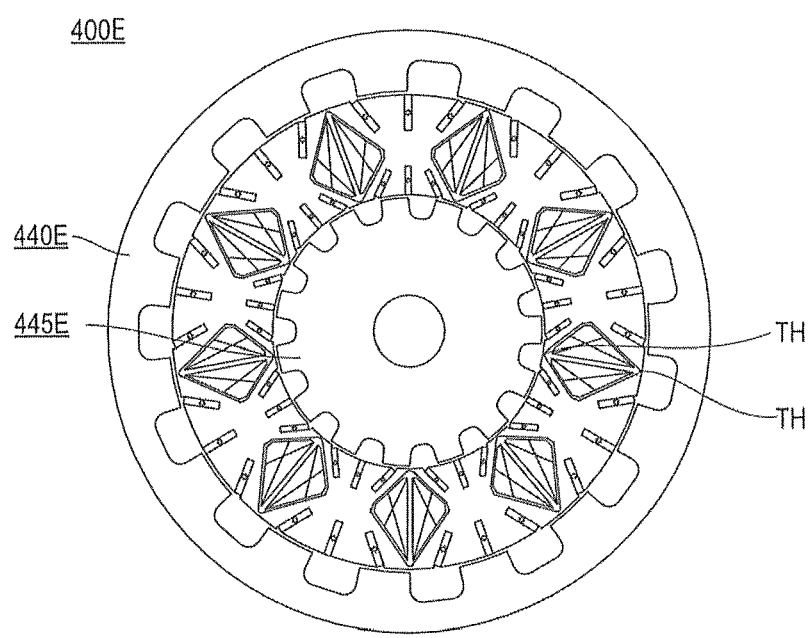
FIG. 19 is a configuration diagram of an inductor type rotary motor according to a fifth modification example of the fourth embodiment.

FIG. 19 shows a configuration diagram of an inductor type rotary motor according to the fifth modification example of the fourth embodiment. FIG. 19 shows a configuration of an inductor type rotary motor 400E in which an inner circumference side rotor 445E is disposed at an inner circumference portion of the inductor type rotary motor 400D shown in FIG. 18.

In each of teeth having a pack shape, three permanent magnets are disposed on a rotor 440E side and an inner circumference side rotor 445E side, respectively. A polarity alignment of the permanent magnets that are disposed in each of the teeth is the same as the alignment of the permanent magnets of the inductor type rotary motor 400 according to the fourth embodiment that is shown in FIG. 14. That is, adjacent permanent magnets that belong to the teeth adjacent to each other are disposed in such a manner that different polarities face each other, and adjacent permanent magnets that belong to the same tooth are also disposed in such a manner that different polarities face each other.

Distal ends of the respective teeth that face both of the rotor 440E and the inner circumference side rotor 445E are circularly disposed. The distal ends of the teeth continue through the thin portion TH without disconnection, and form a cylindrical space at distal end portions of all of the teeth.

Operation of Inductor Type Rotary Motor

In the inductor type rotary motor 400E shown in FIG. 19, the rotor 440E that is located on an outer side of the teeth and the inner circumference side rotor 445E that is located on an inner side of the teeth can rotate independently from each other. When rotor 440E and the rotor 445E are integrated together, torque as a rotor may be increased. The basic operation of the inductor type rotary motor 400E shown in FIG. 19 is substantially the same as that of the inductor type rotary motors 400B and 400D which are shown in FIG. 16 and FIG. 18. The operation of the thin portion TH between the teeth is also substantially the same in each case.

Fifth Embodiment

<Configuration of Inductor Type Rotary Motor>

Figure 20:
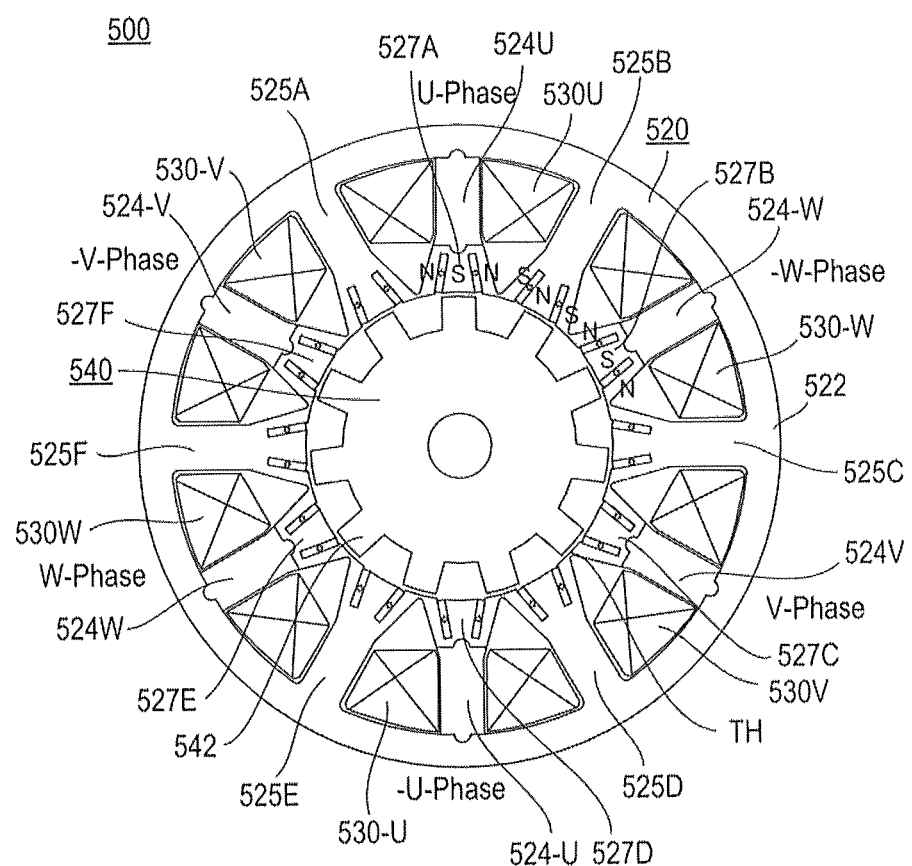
FIG. 20 is a configuration diagram of an inductor type rotary motor according to a fifth embodiment.
Figure 21:
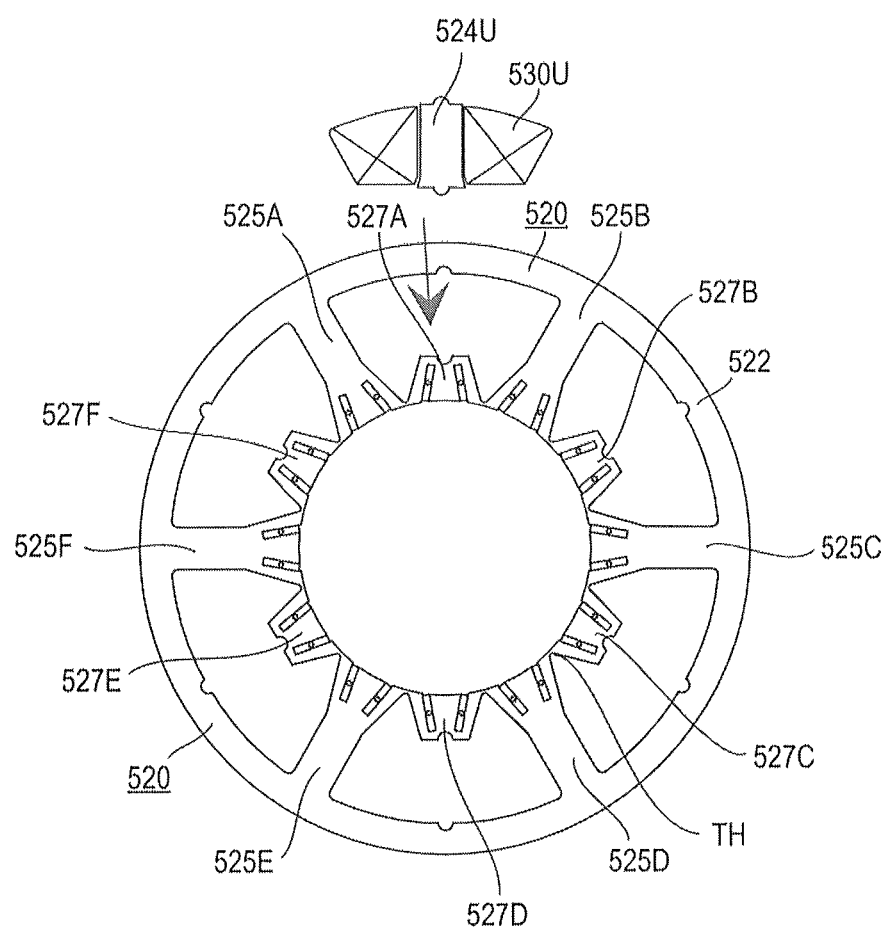
FIG. 21 is an assembly diagram of the inductor type rotary motor shown in FIG. 20.
Figure 22:
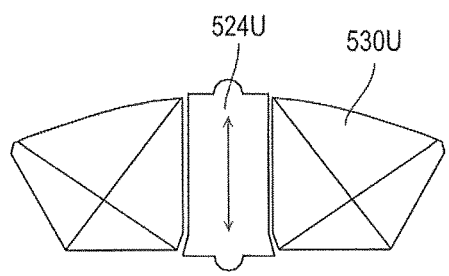
FIG. 22 is a configuration diagram of teeth and a coil of the inductor type rotary motor shown in FIG. 20.
Figure 23:
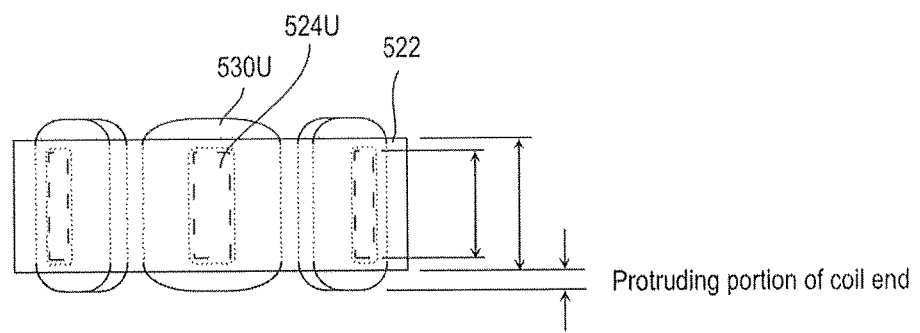
FIG. 23 is a configuration diagram of the coil shown in FIG. 22.

FIG. 20 shows a configuration diagram of an inductor type rotary motor according to a fifth embodiment. FIG. 21 shows an assembly diagram of the inductor type rotary motor shown in FIG. 20. FIG. 22 shows a configuration diagram of teeth and a coil of the inductor type rotary motor shown in FIG. 20. FIG. 23 shows a configuration diagram of the coil shown in FIG. 22.

As shown in FIG. 20, the inductor type rotary motor 500 according to this embodiment includes a stator 520 and a rotor 540.

As shown in FIG. 21, the stator 520 is configured as follows. Columnar support teeth 525A, 525B, 525C, 525D, 525E, and 525F are formed integrally with a cylindrical yoke 522. A magnetic protrusion 527A in which two permanent magnets are disposed is provided between two columnar support teeth 525A and 525B. Similarly, a magnetic protrusion 527B is disposed between the columnar support teeth 525B and 525C, a magnetic protrusion 527C is disposed between the columnar support teeth 525C and 525D, a magnetic protrusion 527D is disposed between the columnar support teeth 525D and 525E, a magnetic protrusion 527E is disposed between the columnar support teeth 525E and 525F, and a magnetic protrusion 527F is disposed between the columnar support teeth 525F and 525A. Two permanent magnets are disposed at a distal end portion of each of the teeth and the magnetic protrusions. The distal end portions of the columnar support teeth continue through a thin portion TH without disconnection, and a cylindrical space is formed at the distal end portions of all of the teeth.

As shown in FIG. 22, a coil 530U is wound around a tooth 524U. Similarly, as shown in FIG. 20, a coil 530-W is wound around a tooth 524-W, a coil 530V is wound around a tooth 524V, a coil 530-U is wound around a tooth 524-U, a coil 530W is wound around a tooth 524W, and a coil 530-V is wound around a tooth 524-V. A width of the columnar support teeth and a width of the teeth may be the same as each other or different from each other. The columnar support teeth and the teeth may be formed by laminating a punched directional electromagnetic steel sheet. In this case, it is preferable that a winding axial direction of a coil and an axis of easy magnetization of the directional electromagnetic steel sheet be parallel with each other. The thickness of the teeth in a lamination direction of the directional electromagnetic steel sheet is set to be smaller than the thickness of the columnar support teeth in the lamination direction of the directional electromagnetic steel sheet. In addition, a width of the teeth in a direction perpendicular to the lamination direction of the directional electromagnetic steel sheet is set to be wider than a width of the columnar support teeth in a direction perpendicular to the lamination direction of the directional electromagnetic steel sheet.

As shown in FIG. 23, the coil 530U is wound around the tooth 524U, but a coil end protrudes from the yoke 522.

As shown in FIG. 21, the tooth 524U around which the coil 530U is wound is held by being supported by the yoke 522 and the magnetic protrusion 527A in a space surround by the columnar support tooth 525A, the columnar support tooth 525B, and the yoke 522. Similarly, as shown in FIG. 20, each of the teeth around which a coil is wound is held by being supported by the yoke 522 and the magnetic protrusion in each space surrounded by the columnar support teeth and the yoke 522. The inductor type rotary motor 500 according to the fifth embodiment is a three-phase inductor type rotary motor including twelve teeth.

Two permanent magnets are disposed at a distal end portion of each of the columnar support teeth 525A to 525F and in each of the magnetic protrusions 527A to 527F. The permanent magnets have a long sheet shape and are disposed with aligned polarities in such a manner that N→S, S→N, S→N, and N→S are repeated in a clockwise direction. Therefore, in adjacent permanent magnets that belong to the teeth adjacent to each other, different polarities face each other, and in adjacent permanent magnets that belong to the same tooth, the same polarities face each other.

The rotor 540 is an eleven-pole salient pole type rotor including eleven inductor teeth 542 that face distal ends of the teeth with a constant gap. The rotor 540 rotates in a cylindrical space formed at distal end portions of all of the teeth. A distal end of each of the inductor teeth 542 of the rotor 540 has an arc shape concentric to the cylindrical space formed at the distal end portions of all of the teeth.

Operation of Inductor Type Rotary Motor

Similar to the inductor type rotary motors shown in the above-described embodiments, in the inductor type rotary motor 500 according to the fifth embodiment, two permanent magnets that are disposed at each of the teeth block a magnetic flux that tends to flow to the thin portion TH present between the teeth. Therefore, a magnetic flux from one tooth flows toward the other adjacent tooth through one inductor tooth 542 of the rotor 540. Accordingly, the rotor 540 generates torque by effectively using the magnetic flux from the stator 520.

According to the inductor type rotary motor 500 according to the fifth embodiment, two permanent magnets are disposed at each of the teeth, and adjacent permanent magnets that belong to the teeth adjacent to each other are disposed in such a manner that different polarities face each other, and adjacent permanent magnets that belong to the same tooth are also disposed in such a manner that different polarities face each other. Therefore, a magnetic flux (short-circuit magnetic flux), which short-circuits teeth and tends to pass from the teeth, other than a magnetic flux that flows through the inside of the rotor 540 from each of the teeth can be guided to the inductor tooth 542 of the rotor 540, and thus large torque can be generated in the rotor 540. In addition, the teeth are connected by the thin portion TH, and thus torque that is generated by the rotor 540 becomes smooth, and it is possible to realize an inductor type rotary motor in which cogging or torque ripple occurs less.

Sixth Embodiment

<Configuration of Inductor Type Rotary Motor>

Figure 24:
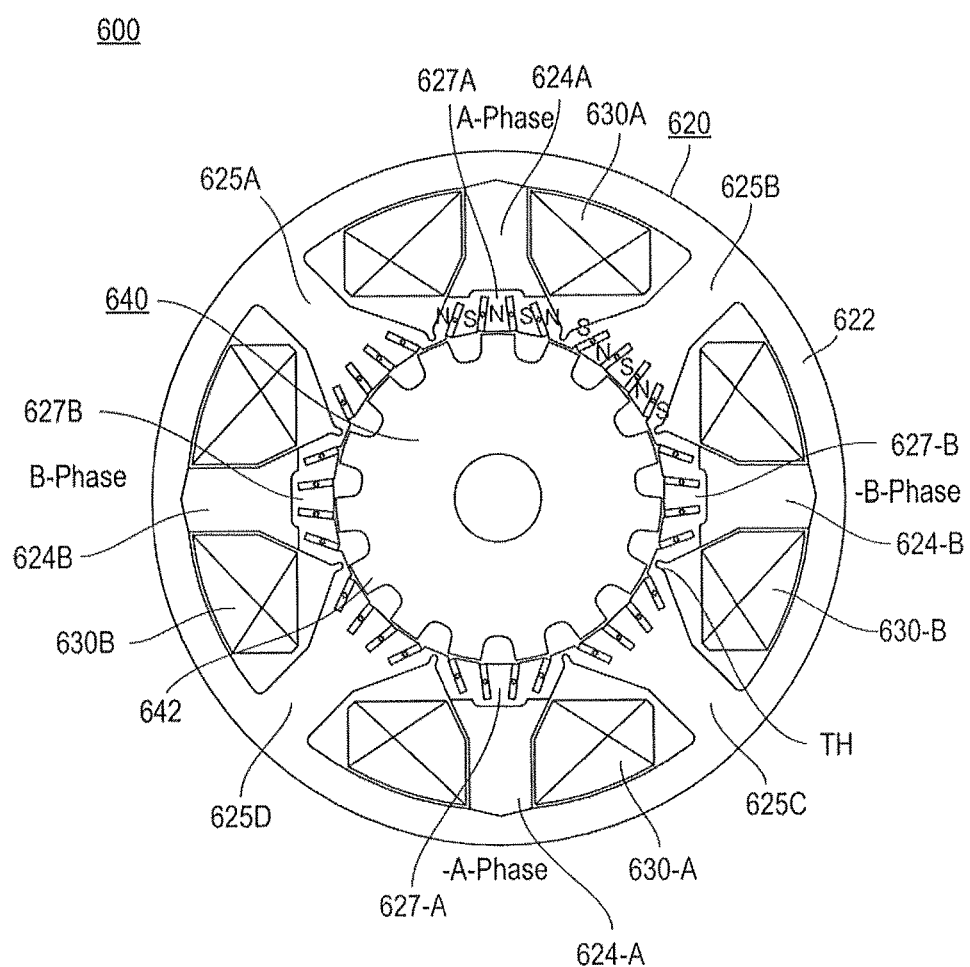
FIG. 24 is a configuration diagram of an inductor type rotary motor according to a sixth embodiment.

FIG. 24 shows a configuration diagram of an inductor type rotary motor according to a sixth embodiment. As shown in FIG. 24, the inductor type rotary motor 600 according to this embodiment includes a stator 620 and a rotor 640.

In the stator 620, columnar support teeth 625A, 625B, 625C, and 625D are formed integrally with a cylindrical yoke 622. Four permanent magnets are disposed at a distal end portion of each of the teeth. A magnetic protrusion 627A in which four permanent magnets are disposed is provided between two columnar support teeth 625A and 625B. Similarly, a magnetic protrusion 627-B is disposed between the columnar support teeth 625B and 625C, a magnetic protrusion 627-A is disposed between the columnar support teeth 625C and 625D, and a magnetic protrusion 627B is provided between the columnar support tooth 625D and 625A. Distal end portions of the columnar support teeth and the magnetic protrusions continue through the thin portion TH without disconnection, and a cylindrical space is formed at the distal end portions of all of the teeth.

A coil 630A is wound around a tooth 624A. Similarly, a coil 630-B is wound around a tooth 624-B, a coil 630-A is wound around a tooth 624-A, and a coil 630B is wound around a tooth 624B.

The tooth 624A around which the coil 630A is wound is held by being supported by a yoke 622 and the magnetic protrusion 627A in a space surrounded by the columnar support tooth 625A, the columnar support tooth 625B, and the yoke 622. Each of the teeth around which a coil is wound is held by being supported by the yoke 622 and the magnetic protrusion in each space surrounded by the columnar support teeth and the yoke 622. Accordingly, the columnar support teeth around which the coil is not wound and the teeth around which the coil is wound are disposed alternately in a circumferential direction. The inductor type rotary motor 600 according to the sixth embodiment is a two-pole and three-phase inductor type rotary motor including eight teeth (two-phase stepping motor).

Four permanent magnets are disposed at a distal end portion of each of the columnar support teeth 625A to 625D and in each of magnetic protrusions 627A, 627-B, 627-A, and 627B. The permanent magnets have a long sheet shape and are disposed with aligned polarities in such a manner that N→S, S→N, S→N, and N→S are repeated in a clockwise direction. Therefore, in adjacent permanent magnets that belong to the teeth adjacent to each other, different polarities face each other, and in adjacent permanent magnets that belong to the same tooth, the same polarities face each other.

The rotor 640 is a fifteen-pole salient pole type rotor including fifteen inductor teeth 642 that face distal ends of the teeth with a constant gap. The rotor 640 rotates in a cylindrical space formed at distal end portions of all of the teeth. A distal end of each of the inductor teeth 642 of the rotor 640 has an arc shape concentric to the cylindrical space formed at the distal end portions of all of the teeth.

<Operation of Inductor Type Rotary Motor>

Figure 25:
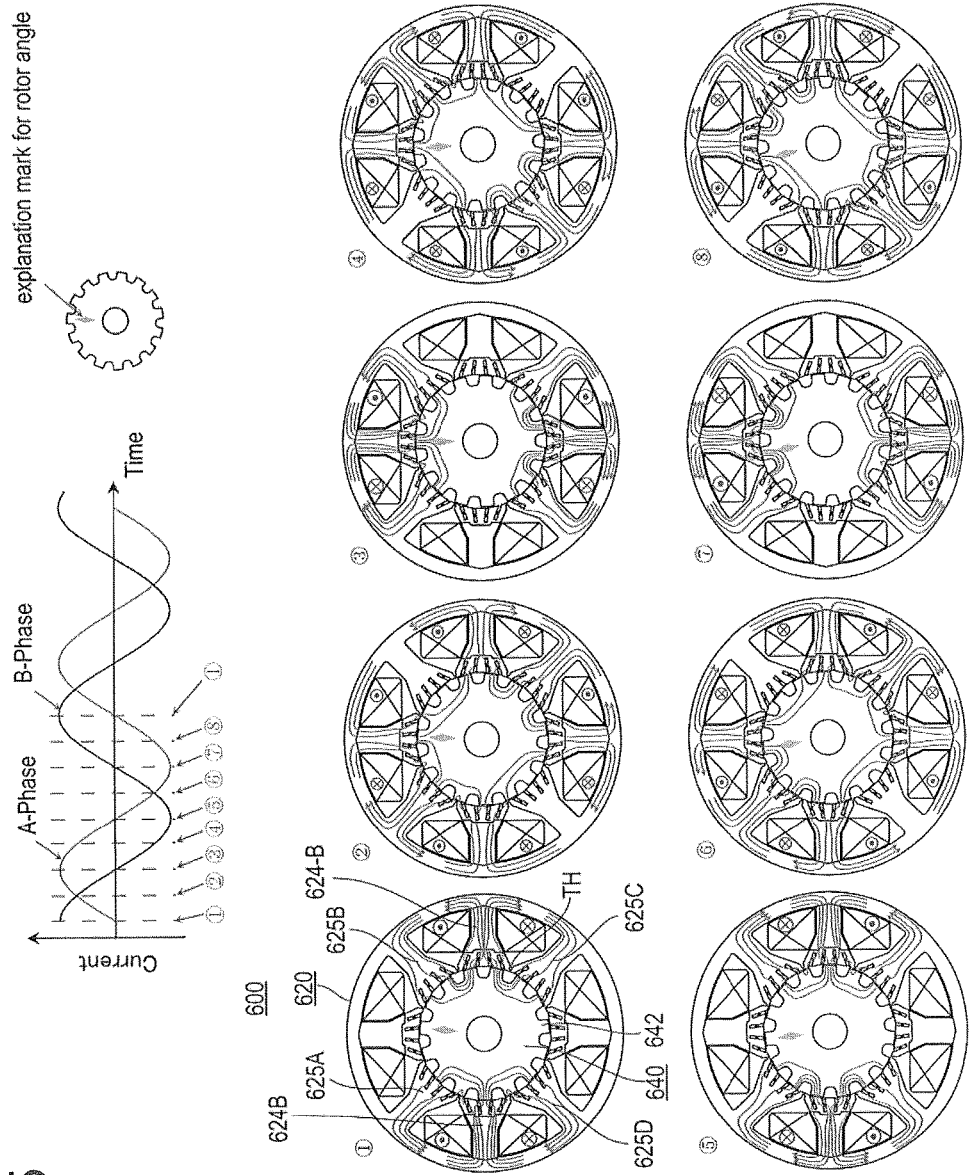
FIG. 25 is a diagram provided for operation explanation of the inductor type rotary motor according to the sixth embodiment.

FIG. 25 shows a diagram provided for operation explanation of the inductor type rotary motor according to the sixth embodiment. In the sixth embodiment, an alternating current of an A-phase, a B-phase, and phases inverted from the A-phase and the B-phase which are shown in FIG. 25 is allowed to flow to the coils 630A, 630-B, 630-A, and 630B shown in FIG. 24. FIG. 25 shows a magnetic flux distribution between the stator 620 and the rotor 640 at that time by dividing the rotation of the rotor 640 with a pitch of 45°.

As shown in FIG. 25, along with rotation of the rotor 640, a magnetic flux is distributed between the rotor 640 and the stator 620 as indicated by an arrow for each stage. In the case of the inductor type rotary motor 600 according to the sixth embodiment, when the distal end of one inductor tooth 642 of the rotor 640 is located at a position that spans two adjacent teeth, a magnetic flux from one tooth flows toward the other adjacent tooth through one inductor tooth 642 of the rotor 640 without passing through a thin portion TH. Therefore, the rotor 640 generates torque by effectively using the magnetic flux from the stator 620.

Each of the teeth and each of the magnetic protrusions continue through the thin portion TH, but a magnetic flux does not flow to the thin portion TH. The reason for this is as follows. Four permanent magnets are disposed in each of the teeth and the magnetic protrusions, and the permanent magnets of the tooth and the magnetic protrusion that are adjacent to each other are disposed with the thin portion TH interposed therebetween. Therefore, a magnetic flux from a permanent magnet of an adjacent tooth flows to the thin portion TH, and thus the thin portion TH enters a magnetic saturation state.

As described above, in the inductor type rotary motor 600 according to the sixth embodiment, since a magnetic flux between adjacent teeth passes through the inductor tooth 642 of the rotor 640, the magnetic flux that is generated by the coil is effectively used and becomes torque that rotates the rotor 640. Since adjacent teeth continue through the thin portion TH, a torque variation that occurs in the rotor 640 becomes smooth, and thus cogging or torque ripple occurs less.

According to the inductor type rotary motor 600 according to the sixth embodiment, four permanent magnets are disposed at each of the teeth, and adjacent permanent magnets that belong to teeth that are adjacent to each other are disposed in such a manner that different polarities face each other, and adjacent permanent magnets that belong to the same tooth are disposed in such a manner that the same polarities face each other. Therefore, a magnetic flux (short-circuit magnetic flux), which short-circuits teeth and tends to pass from the teeth, other than a magnetic flux that flows through the inside of the rotor 640 from each of the teeth can be guided to the inductor tooth 642 of the rotor 640, and thus large torque can be generated in the rotor 640. In addition, the teeth are connected by the thin portion TH, and thus torque that is generated by the rotor 640 becomes smooth, and it is possible to realize an inductor type rotary motor in which cogging or torque ripple occurs less.

[First Modification Example of Sixth Embodiment]
<Configuration of Inductor Type Rotary Motor>

Figure 26:
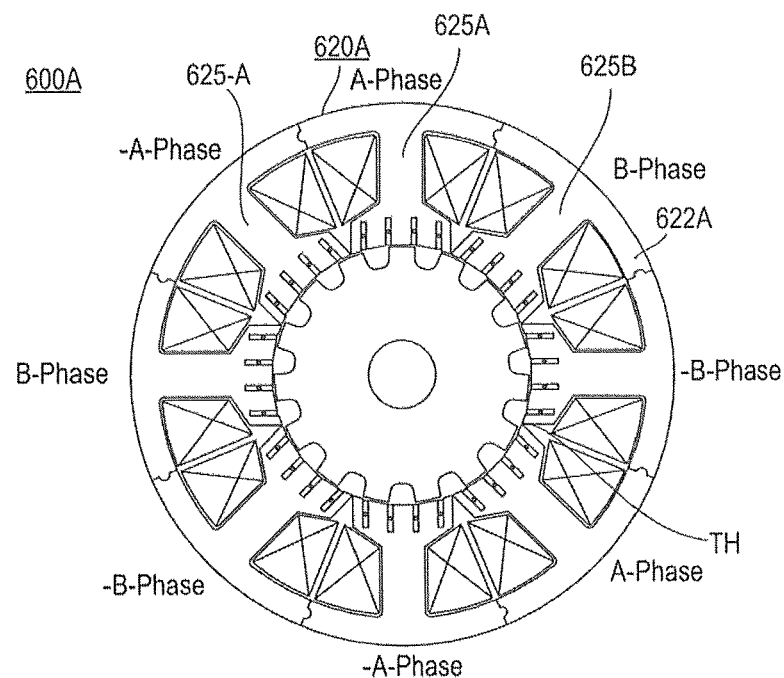
FIG. 26 is a configuration diagram of an inductor type rotary motor according to a first modification example of the sixth embodiment.

FIG. 26 shows a configuration diagram of an inductor type rotary motor according to a first modification example of the sixth embodiment. The inductor type rotary motor 600A shown in FIG. 26 is different from the inductor type rotary motor 600 shown in FIG. 25 in a configuration of the stator 620A.

The inductor type rotary motor 600A is constituted by eight teeth. A tooth 625A includes a yoke on an outer circumference side and four permanent magnets on an inner circumference side. This configuration is true of the other teeth such as a tooth 625-A and a tooth 625B. When the respective teeth are combined, the stator 620A as shown in FIG. 26 is formed. A distal end portion of the tooth which includes the inner circumference side magnets is close to a distal end portion of an adjacent tooth, and securely comes into contact with the distal end portion, thereby forming a thin portion TH. On the other hand, the outer circumference side tooth securely comes into contact with an adjacent tooth, thereby forming a yoke 622A. It is preferable that the adjacent teeth that form the yoke 622A come into contact with each other without a gap so as to prevent an increase in a magnetic resistance.

<Operation of Inductor Type Rotary Motor>

The operation of the inductor type rotary motor 600A shown in FIG. 26 is different from the operation of the inductor type rotary motor 600 shown in FIG. 24 in the number of phases, but the basic operation is substantially the same in each case. The operation of the thin portion TH between the teeth is also substantially the same in each case.

[Second Modification Example of Sixth Embodiment]

Figure 27:
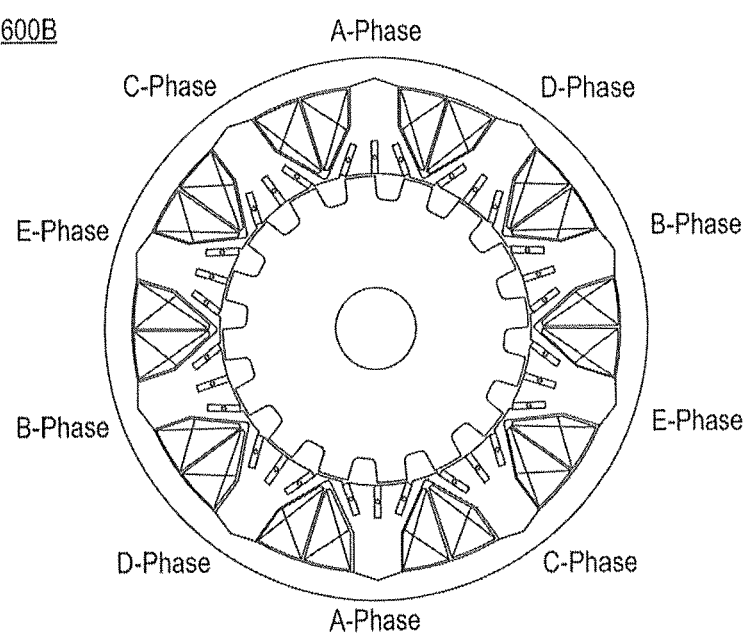
FIG. 27 is a configuration diagram of an inductor type rotary motor according to a second modification example of the sixth embodiment.

FIG. 27 shows a configuration diagram of an inductor type rotary motor according to a second modification example of the sixth embodiment. The inductor type rotary motor 600B shown in FIG. 27 is different from the inductor type rotary motor 400C shown in FIG. 17 in that the number of coils is set to 10, and an alternating current of five phases including A-phase, B-phase, C-phase, D-phase, and E-phase is applied to constitute a stepping motor. The other configurations are substantially the same as that of the inductor type rotary motor 400C. In addition, the basic operation is also substantially the same as that of the inductor type rotary motor 400C.

[Third Modification Example of Sixth Embodiment]

Figure 28:
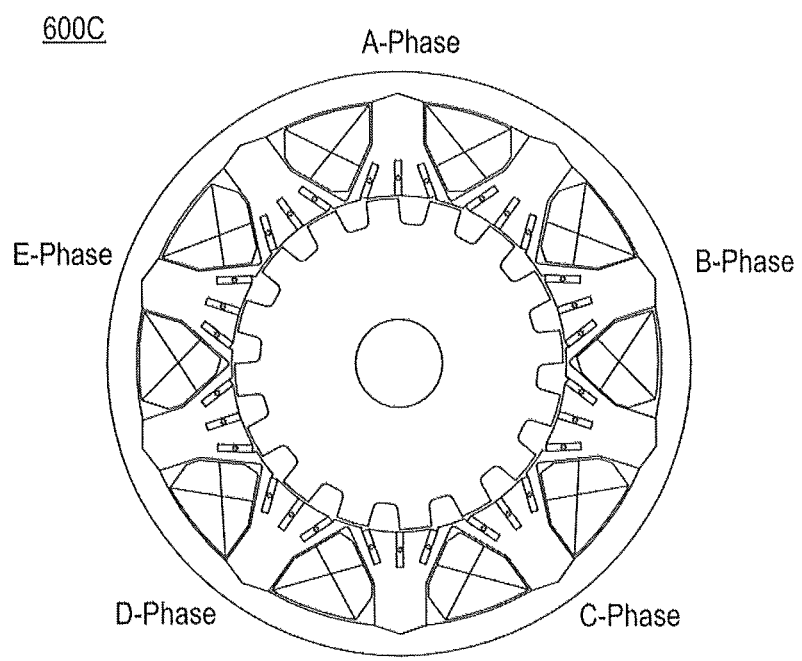
FIG. 28 is a configuration diagram of an inductor type rotary motor according to a third modification example of the sixth embodiment.

FIG. 28 shows a configuration diagram of an inductor type rotary motor according to a third modification example of the sixth embodiment. The inductor type rotary motor 600C shown in FIG. 28 has substantially the same configurations as the inductor type rotary motor 600B shown in FIG. 27 except for a coil winding method. In addition, the basic operation is also substantially the same as that of the inductor type rotary motor 600B.

As described above, according to the inductor type rotary motors according to the present invention, a permanent magnet is disposed in each of the teeth, and adjacent permanent magnets that belong to teeth that are adjacent to each other are disposed in such a manner that different polarities face each other, and thus a short-circuit magnetic flux between teeth can be reduced, and the short-circuit magnetic flux can be effectively used. Accordingly, torque per size is improved, and thus an application range of a motor can be broadened and a used amount of permanent magnets can be reduced.

In addition, the inductor type rotary motors that are exemplified in the above-described embodiments are not intended to limit a technical scope of the present invention.

What is claimed is:
1. An inductor type rotary motor of m-phase (m represents an integer of 2 or more), comprising:
a stator that includes teeth in a circumferential shape; and
a rotor that includes an inductor tooth row that faces the stator through a gap,
wherein the stator includes k·m teeth (k represents an integer of 1 or more),
each of the teeth having only a single permanent magnet aligned with a radial axis and magnetized in a circumference direction, the single magnet being disposed at an inner face of the distal end of each of the teeth, and adjacent permanent magnets that belong to teeth adja- cent to each other are disposed in such a manner that different polarities face each other; and the inner face of the distal end of each of the teeth comes into contact with an adjacent tooth through a thin portion without a gap.

2. The inductor type rotary motor according to claim 1, wherein each of the permanent magnets is inserted into an accommodation hole that is formed in each of the teeth, and the accommodation hole is formed in a plurality of the teeth, which are adjacent to each other, in a circumferential direction with a constant interval.

3. The inductor type rotary motor according to claim 1, wherein the stator has a structure capable of being divided for each tooth around which a coil is wound, a directional electromagnetic steel sheet is used for a coil winding portion of the tooth, and a magnetic flux passing direction in the coil winding portion and an axis of easy magnetization of the directional electromagnetic steel sheet are parallel with each other.

4. The inductor type rotary motor according to claim 3, wherein a thickness of the tooth in a lamination direction of the directional electromagnetic steel sheet is smaller than a thickness of the columnar support tooth in the lamination direction of the directional electromagnetic steel sheet.

5. The inductor type rotary motor according to claim 1, wherein in the stator, a columnar support tooth around which a coil is wound and a tooth around which the coil is not wound are alternately disposed in the circumferential direction.

6. The inductor type rotary motor according to claim 5, wherein a width of the tooth in a direction perpendicular to the lamination direction of the directional electromagnetic steel sheet is wider than a width of the columnar support tooth in a direction perpendicular to the lamination direction of the directional electromagnetic steel sheet.

7. The inductor type rotary motor according to claim 1, wherein the rotor is disposed on an inner circumference side or an outer circumference side of the stator through a gap with the stator.

8. The inductor type rotary motor according to claim 1, wherein the rotor is disposed on an outer circumference side and an inner circumference side of the stator through a gap with the stator.

9. The inductor type rotary motor according to claim 1, wherein when the number of phases is set as m (m is an integer of 2 or more), the number of the teeth is set as k·m (k represent an integer of 1 or more), and the number of the permanent magnets on the distal end for one tooth is set as n (n represents an integer of 1 or more), the number i of inductor teeth of the rotor satisfies a relationship of $1.5 \leq (k \cdot m \cdot n)/i < 2$ or $2 < (k \cdot m \cdot n)/i < 2.5$.

10. An inductor type rotary motor of m-phase (m represents an integer of 2 or more), comprising:

a stator that includes teeth in a circumferential shape; and a rotor that includes an inductor tooth row that faces the stator through a gap, wherein the stator includes k·m teeth (k represents an integer of 1 or more), two or more permanent magnets are disposed at an inner face of the distal end of each of the teeth, adjacent permanent magnets that belong to the same tooth are disposed in such a manner that the same polarities face each other, and the inner face of the distal end of each of the teeth comes into contact with an adjacent tooth through a thin portion without a gap;

wherein each of the two or more permanent magnets are substantially aligned with a radial axis and magnetized in a substantially circumference direction;

wherein the stator surrounds the rotor.

11. The inductor type rotary motor according to claim 10, wherein the adjacent permanent magnets that belong to teeth adjacent to each other are disposed in such a manner that different polarities face each other.

12. The inductor type rotary motor according to claim 10, the magnets are disposed in an inclined manner in order for at least one permanent magnet to be gradually close to the other permanent magnet.

* * * * *